United States Patent
Takahashi et al.

(10) Patent No.: US 7,948,231 B2
(45) Date of Patent: May 24, 2011

(54) ROTATION DETECTING APPARATUS HAVING MAGNETIC SENSOR ARRAY AND BEARING PROVIDED WITH SAME

(75) Inventors: Toru Takahashi, Iwata (JP); Shoji Kawahito, Hamamatsu (JP)

(73) Assignees: NTN Corporation, Osaka (JP); Hamamatsu Foundation for Science and Technology Promotion, Shizuoka (JP)

( * ) Notice: Subject to any disclaimer, the term of this patent is extended or adjusted under 35 U.S.C. 154(b) by 817 days.

(21) Appl. No.: 11/792,814

(22) PCT Filed: Dec. 6, 2005

(86) PCT No.: PCT/JP2005/022334
§ 371 (c)(1),
(2), (4) Date: Jun. 12, 2007

(87) PCT Pub. No.: WO2006/064687
PCT Pub. Date: Jun. 22, 2006

(65) Prior Publication Data
US 2008/0111542 A1    May 15, 2008

(30) Foreign Application Priority Data

Dec. 14, 2004 (JP) ................... 2004-361740
Jan. 27, 2005 (JP) ................... 2005-019641
Jun. 7, 2005 (JP) ................... 2005-167127

(51) Int. Cl.
*G01B 7/30* (2006.01)
(52) U.S. Cl. ............ 324/207.25; 324/207.2; 324/174
(58) Field of Classification Search .......... None
See application file for complete search history.

(56) References Cited

U.S. PATENT DOCUMENTS

| | | | | |
|---|---|---|---|---|
| 4,490,674 | A | * | 12/1984 | Ito .................. 324/207.25 |
| 4,929,993 | A | | 5/1990 | Popovic |
| 5,055,781 | A | * | 10/1991 | Sakakibara et al. ..... 324/207.21 |
| 5,057,890 | A | | 10/1991 | Falk et al. |
| 5,545,985 | A | * | 8/1996 | Campbell ............ 324/207.21 |
| 5,621,319 | A | | 4/1997 | Bilotti et al. |
| 5,640,090 | A | | 6/1997 | Furuya et al. |
| 6,320,373 | B1 | | 11/2001 | Strasser |
| 6,744,248 | B2 | * | 6/2004 | Buchhold et al. ........ 324/207.21 |
| 6,828,781 | B1 | * | 12/2004 | Butzmann ............ 324/207.19 |

(Continued)

FOREIGN PATENT DOCUMENTS

DE    4003161 A1 *  8/1991

(Continued)

OTHER PUBLICATIONS

International Preliminary Report on Patentability issued in corresponding International Application No. PCT/JP2005/022334, mailed on Jun. 28, 2007.

(Continued)

*Primary Examiner* — Jay M Patidar

(57) ABSTRACT

A rotation detecting apparatus capable of increasing the angle detecting precision without being affected by an offset signal resulting from a stress in a silicon chip. The rotation detecting apparatus includes a magnetic sensor array and a magnet rotatable in face-to-face relation with the magnetic sensor array. The magnetic sensor array includes a plurality of groups of sensor elements, each group including four sensor elements. The four sensor elements of each combined sensor element group are so arranged as to be oriented vertically and horizontally in four directions and connected parallel to each other.

9 Claims, 22 Drawing Sheets

U.S. PATENT DOCUMENTS

| | | | |
|---|---|---|---|
| 7,078,892 B2 * | 7/2006 | Kurumado | 324/207.21 |
| 2004/0247163 A1 | 12/2004 | Hara | |
| 2004/0257067 A1 * | 12/2004 | Mattson et al. | 324/207.2 |
| 2006/0011999 A1 | 1/2006 | Schott et al. | |
| 2009/0033321 A1 * | 2/2009 | Kurihara | 324/207.25 |

FOREIGN PATENT DOCUMENTS

| | | |
|---|---|---|
| JP | 60-220874 | 11/1985 |
| JP | 61-8619 | 1/1986 |
| JP | 62-50297 | 11/1987 |
| JP | 62-502927 | 11/1987 |
| JP | 2-94580 | 4/1990 |
| JP | 6-302876 | 10/1994 |
| JP | 7-83612 | 3/1995 |
| JP | 8-160114 | 6/1996 |
| JP | 8-201490 | 8/1996 |
| JP | 9-196699 | 7/1997 |
| JP | 10-300513 | 11/1998 |
| JP | 11-514494 | 12/1999 |
| JP | 2001-521152 | 11/2001 |
| JP | 2002-243407 | 8/2002 |
| JP | 2003-148999 | 5/2003 |
| JP | 2004-37133 | 2/2004 |
| JP | 2004-125635 | 4/2004 |
| JP | 2004-317353 | 11/2004 |
| JP | 2005-043070 | 2/2005 |
| WO | 97/09742 | 3/1997 |
| WO | 99/21023 | 4/1999 |
| WO | 2004/025742 A1 | 3/2004 |

OTHER PUBLICATIONS

Japanese Office Action issued Oct. 20, 2009 in corresponding Japanese Patent Application 2004-361740.

Japanese Office Action issued Oct. 20, 2009 in corresponding Japanese Patent Application 2005-019641.

International Search Report of International Published Application No. PCT/JP2005/022334 (mailed Mar. 20, 2007).

Shen-Iuan Liu et al., "SPICE Macro Model for MAGFET and its Applications" IEEE Transactions on Circuits and Systems, Analog and Digital Signal Processing, vol. 46, No. 4, Apr. 1999, pp. 370-375.

Yozo Kanda, "A Graphical Representation of Piezoresistance Coefficients in Silicon", IEEE Transactions on Electron Device, vol. ED-29, No. 1, Jan. 1982, pp. 64-70.

Jeffery C. Suhling et al., "Silicon Piezoresistive Stress Sensors and Their Application in Electronic Packaging", IEEE Sensors Journal, vol. 1, No. 1, Jun. 2001, pp. 14-30.

R. Steiner et al., "Offset reduction in Hall devices by continuous spinning current method", Sensors and Actuators A. (1998) pp. 167-172.

Xinyu Zheng et al., "General Characteristics and Current Output Mode of a MOS Magnetic Field Sensor", Sensors and Actuators, A28 (1991) pp. 1-5.

James J. Clark, "Split-drain MOSFET Magnetic Sensor Arrays", Sensors and Actuators, A24 (1990) pp. 107-116.

"A CMOS Smart Magnetic Rotary Encoder Using Magnetic Sensor Arrays", published by The Institutes of Electronics, Information, and Communication Engineers, on Jul. 6, 2004, vol. 104, No. 174, pp. 66-74, Abstract only.

"A CMOS Rotary Encoder System Based on Magnetic Pattern Analysis with a Resolution of 10b per Rotation", published by the Institute of Electronics, Information, and Communication Engineers, on May 19, 2005, vol. 105, No. 95, pp. 35-40, Abstract only.

Japanese Office Action issued Jul. 13, 2010 in corresponding Japanese Patent Application 2005-167127.

* cited by examiner

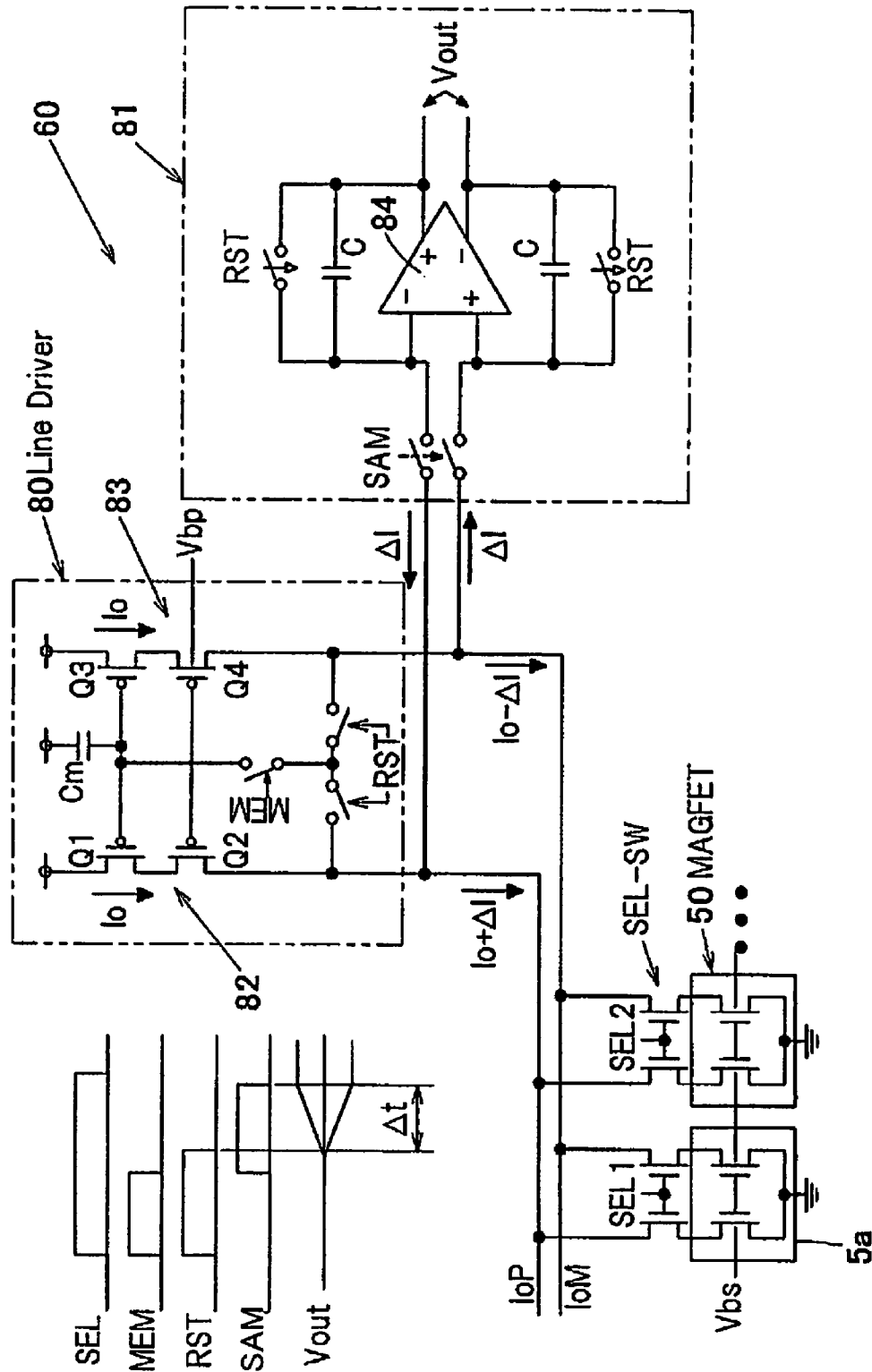

ROTATION DETECTING APPARATUS HAVING MAGNETIC SENSOR ARRAY AND BEARING PROVIDED WITH SAME

CROSS REFERENCE TO RELATED APPLICATIONS

This application is based on and claims priority to International Application No. PCT/JP2005/022334 filed Dec. 6, 2005, and Japanese Application No(s). 2004-361740 filed Dec. 14, 2004, 2005-019641 filed Jan. 27, 2005 and 2005-167127 filed Jun. 7, 2005, the disclosures of which are hereby incorporated herein by reference.

BACKGROUND OF THE INVENTION

1. Field of the Invention

The present invention relates to a rotation detecting apparatus for detecting the rotation of various machines and equipments such as, for example, for detecting the rotation for controlling rotation of a compact motor, or for detecting the rotation for detecting the position within a business equipment, and also to a bearing assembly equipped with such rotation detecting apparatus.

2. Description of the Prior Art

Taking advantage of the compactness and the easiness of assemblage, a bearing assembly having a rotation sensor built therein has hitherto been suggested. One example of such bearing assembly is shown in FIG. 29. In this example, a rotating ring 52 of a rolling bearing assembly 51 is fixed with a member including a magnetic encoder 54 in the form of rubber magnets having a plurality of alternating magnetic poles N and S deployed in a circumferential direction thereof, and a stationary ring 53 is fixed with a member including a magnetic sensor 55 such as, for example a Hall element or the like so that rotation pulse signals and/or direction of rotation can be obtained.

However, in the structure in which the magnetic encoder 54 is provided in the manner as hereinabove described, in the case of a small diameter bearing, which is a rolling bearing assembly of a small size, problems have been recognized in that it is difficult to allow the magnetic sensor 55 to be accommodated within the outer diametric size of the stationary ring 53 and, also, to detect the rotation angle with high precision enough to secure the number of rotation pulses that is equal to or greater than 500 per each complete rotation.

In view of the foregoing, as a rotational angle detecting device capable of being incorporated in a compact machine and also cable of providing an output descriptive of the rotation angle with high precision, a device utilizing a sensor array has been suggested. (See, for example, the Japanese Laid-open Patent Publication No. 2003-148999 published May 21, 2003.) Such device is of a structure, in which a sensor array comprised of a plurality of magnetic sensor elements is integrated on a sensor chip together with a signal amplifier circuit, an analog-to-digital (A/D) converter circuit and a digital signal processing circuit, which sensor chip is in turn arranged in face-to-face relation to a magnet head mounted on a rotating member. It is the principle of this method that the magnetic sensor array detects a distribution of magnetic fields generated by the magnetic head arranged in face-to-face relation with the sensor chip so that the rotation angle of the magnet can be detected from this distribution. However, in the case of this construction, in a semiconductor circuit, it is unavoidable for circuit elements, integrated on a silicon chip, to result in variation in characteristic and offset variations of the sensor elements tend to occur even in the magnetic sensor array, thus constituting a cause of degradation of the angle detecting precision.

As an improvement to the Japanese Laid-open Patent Publication No. 2003-148999, it has been suggested to arrange the magnetic sensor elements of the sensor array in parallel relation to each other in an attempt to reduce the offset variations for the purpose of reducing the degradation of the angle detecting precision. (See, for example, the Japanese Laid-open Patent Publication No. 2004-037133, published Feb. 5, 2004.) However, even though the magnetic sensor elements are arranged in parallel relation to each other, the residual offset variation still affects the angle detection.

For the magnetic sensor elements referred to above, MAGFET elements are generally utilized, each of which has such a characteristic that when the element is subjected to a vertically acting magnetic field, a non-equilibrium occurs in electric currents flowing across two drain terminals thereof enough to provide a current difference that represents a magnetic signal desired to be detected. However, the current difference generated from the magnetic sensor element is so considerably small as to require amplification thereof.

The magnetic detecting circuit, in which the magnetic sensor elements, i.e., MAGFET elements of the kind discussed above are employed, is reported by Shen-Iuan Liu, Jian-Fan Wei and Guo-Ming Sung in their "SPICE Macro Model for MAGFET and its Applications", IEEE Trans. Circuits and Systems II, Analog and Digital Signal Processing, vol. 46, 4, 1999, (which is referred to as the non-Patent Document 1). According to this non-Patent Document 1, the current obtained from the terminals of the sensor element is converted into a current difference, which is in turn converted into a voltage signal by the use of an OP amplifier.

However, the circuit disclosed in the non-Patent Document 1 referred to above handles signals on a single-ended system and is therefore susceptible to influence brought about by noises, as well as tends to result in an insufficient amplification factor when the current difference is small. In view of this, the rotation detecting apparatus disclosed in the non-Patent Document 1 referred to above requires the following to be satisfied.

Where a signal from the sensor array is converted into a digital signal in order to calculate the angle, the sensor signal has to be amplified to an amplitude of at least about 1 to 2 volts before it is supplied to an analog-to-digital (A/D) converter. Therefore, a circuit of a structure effective to convert it to a voltage with sufficient amplification factor and operating speed is necessary, resulting in increase of the electric power consumption.

In addition, as a method for canceling the offset of the magnetic sensor elements, the method is known in which the elements are connected parallel to each other, as FIG. 30 shows one example thereof. In the example shown in FIG. 30, two elements 45a and 45b each having two drain terminals D1 and D2 are connected in such a manner that the same drain terminals D1 of those elements 45a and 45b are connected together and the same drain terminals D2 of those elements 45a and 45b are similarly connected together, with connection lines between the drain terminals D1 and between the drain terminals D2 crossing relative to each other.

Those drain currents between the two magnetic sensor elements 45a and 45b, formed on a silicon wafer in juxtaposed relation to each other, are considered ideal if they have an equal amount in the absence of magnetic fields. However, a cant component will occur depending on the manufacturing process, which can result in an offset signal. Specifically, in the presence of this cant component in, for example, a direction rightwards as shown by the arrow A, in each of the magnetic sensor elements 45a and 45b the current will tend to flow rightwards as shown by the respective arrows a and b in FIG. 30. The method in which the drain terminals are cross-connected in the manner shown in FIG. 30 is effective to counterbalance the offset signals occurring in those two sensor elements 45a and 45b.

However, even where the magnetic sensor elements 45a and 45b are connected parallel to each other as in the example shown in FIG. 30, variation of the residual offset unavoidably adversely affects the precision of angle detection. In particular, in the case where the magnetic sensor elements used is of a native substrate type, a considerable piezoresistive effect brought about by a warp of the silicon chip causes a problem in that the offset of the sensors changes considerably.

It is to be noted that studies on the piezoresistive effect resulting from the warp of the silicon wafer is reported by Yozo Kanda in his "A Graphical Representation of the Piezoresistance Coefficients in Silicon", IEEE Trans. Electron Device, vol. ED-29, No. 1, January 1982, which is referred to as a non-Patent Document 2, and Jefferey C. Suhling in his "Silicon Piezoresistive Stress Sensors and Their Application in Electronic Packaging", IEEE Sensors Journal, vol. 1, No. 1, 2001, which is referred to as a non-Patent Document 3. The method of reducing the influence brought about by stresses in Hall elements is reported by, for example, R. Steiner, et al. in their "Offset Reduction in Hall Devices by Continuous Spinning Current Method", Sensors and Actuators, A66, pp. 167-172, 1998, which is referred to as a non-Patent Document 4.

Specifically, in the sensor element formed in a silicon wafer 40 shown in FIG. 31, the offset component brought about by the piezoresistive effect is caused mainly by a change in resistivity in a 45° orientation relative to the sensor element (according to the non-Patent Document 2). The piezoresistive effect in such case is a phenomenon, in which the electric resistivity in each of X1 and X2 directions of the wafer 40 shown in FIG. 31 changes depending on the stress condition loaded on the wafer 40.

In the circuit configuration in which the magnetic sensor elements are connected parallel as shown in FIG. 30, influence brought about by the stress (shown by S in FIG. 32A) in the silicon chip appears, as shown in FIG. 32A, as a change of the electric resistivity in a direction 45° angled relative to the sensor elements 45a and 45b. Accordingly, the offsets appearing in those two sensor elements 45a and 45b assume the same polarity and are not counterbalanced in this connection. In other words, in FIG. 32A, the resistivity in the rightwardly upward direction (the leftwardly downward direction) becomes lower than the resistivity in a direction perpendicular thereto and, consequently, an imbalanced current flow occurs inside the sensor elements 45a and 45b as shown by the arrows a and b. FIG. 32B illustrates a condition in which a magnetic field Bz is applied while in a condition shown in FIG. 32A. The sensor signal in such case ideally represents an output proportional to the intensity of the magnetic field, but represents a signal superimposed with the stress induced offset.

Also, it has been suggested to determine the rotation angle of the magnet based on an output of the magnetic sensor array. (See, for example, the Japanese Laid-open Patent Publications No. 2004-037133 and No. 2005-043070 published Feb. 17, 2005.) Those publications suggest a rotation detecting device which includes a sensor unit in the form of a sensor array composed of a plurality of arranged magnetic sensor elements and integrated on a semiconductor chip together with a signal amplifying circuit, an A/D converting circuit and a digital signal processing circuit. However, those publications are silent as to a specific type of the magnetic sensor elements.

Xinyu Zheng and Suzhi Wu disclose, in their "General Characteristics and Current Output Mode of a MOS Magnetic Field Sensor", Sensors and Actuators, A28 (1991), pp-5, which is referred to as a non-Patent Document 5, the fundamental characteristics of the magnetic sensor element MAG-FET and indicate the presence of a certain reduction in magnetic sensitivity during the operation at a linear region. However, nothing is mentioned of the offset variation.

James J. Clark has suggested, in his "Split-drain MOSFET Magnetic Sensor Arrays", Sensors and Actuators, A24 (1990), pp-107-116, which is referred to as a non-Patent Document 6, a method in which the magnetic sensor elements MAGFETs are arranged in a matrix pattern to detect a distribution of magnetic fields. He has also used a read-out circuit based on a simple voltage converting circuit and has described the offset variation of the sensor output being considerable.

SUMMARY OF THE INVENTION

In view of the foregoing, an object of the present invention is to provide a rotation detecting apparatus capable of increasing the angle detecting accuracy with a minimized power consumption and without being affected by an offset signal resulting from strains occurring in the silicon chip and, also, a bearing assembly equipped with such rotation detecting apparatus.

Another object of the present invention is to provide a magnetic array sensor circuit capable of performing highly precise detection with a minimized offset variation occurring in the magnetic sensor elements and also capable of increasing the quality of an output signal from the sensor array.

The rotation detecting apparatus according to one aspect of the present invention includes a magnetic sensor array including a plurality of combined sensor element groups, each group including four sensor elements, the four sensor elements of each combined sensor element group being so arranged as to be oriented vertically and horizontally in four directions and connected parallel to each other; and a magnet rotatable in face-to-face relation with the magnetic sensor array.

According to this construction, since the four sensor elements are so arranged as to be oriented vertically and horizontally in four directions and connected parallel to each other, the sensor elements are oriented displaced 90° relative to each other. In those sensor elements so displaced 90° relative to each other, the effect of stresses is reversed. For this reason, when the four sensor elements are so arranged as to be oriented vertically and horizontally in four directions and are connected parallel to each other to form a respective combined sensor element group, the offset signal from the sensor elements resulting from warping of the semiconductor chip can be reduced in a magnetic signal outputted from the magnetic sensor array. When the offset signal reduces, the angle detecting accuracy of the rotation detecting apparatus increases and the resolution and the accuracy as a rotary encoder can be increased. In this construction, there is no need to change the process of manufacturing of the sensor element in an attempt to reduce the offset signal and, therefore, no cost will increase.

In the present invention, the four sensor elements of each combined sensor element group may be arranged in a cruciform pattern. The cruciform arrangement of the four sensor elements is advantageous in that the pattern of connecting wirings used to connect the sensor elements together can be shortened and simplified.

The four sensor elements of each combined sensor element group may be arranged dispersed. "Arranged dispersed" means that the sensor elements are dispersed without respective drain terminals thereof concentrated in one area. In other words, the sensor elements may be arranged in a line or a plurality of lines.

Even when the dispersed arrangement is employed, the effect of reducing the offset, which is substantially similar to that obtained when the sensor elements are arranged in the cruciform pattern, can be obtained. Where the dispersed arrangement is employed, the sensor elements can be flexibly arranged and can be efficiently arranged so that formation of unnecessary areas in the substrate can be minimized.

In the present invention, connection between the sensor element, oriented vertically, and the sensor elements, oriented horizontally, may be provided in two modes. Those two modes of connection include a first connection mode for detecting a magnetic signal and a second connection mode for detecting a stress signal.

When the two modes of connection is employed, by selectively using only an output from the magnetic sensor array held in either one of the connection modes, one of the magnetic signal and the stress signal is selectively detected so that one of a rotary sensor and a stress sensor can be selectively used.

Where the two connection modes are employed as described above, a connection mode selecting unit may be employed for selecting one of the two modes of connection. The connection mode selecting unit makes use of, for example, a predetermined signal applied from an external part to select the particular connection mode. In such case, the two connection modes include a first connection mode for detecting the magnetic signal and a second connection mode for detecting the stress. Thus, the use of the connection mode selecting unit is effective to facilitate selection of one of the two connection modes from the external circuit and, also, to allow the only magnetic sensor array to be used selectively as one of the rotary sensor and the stress sensor one at a time.

A bearing assembly equipped with the rotation detecting apparatus according to the present invention makes use of the rotation detecting apparatus according to the foregoing first aspect of the present invention. In this bearing assembly, the magnetic sensor array is provided in a stationary raceway member and the magnet is provided in a rotating raceway member.

According to this construction, by integrating the rotation detecting apparatus with the rolling bearing assembly, not only can the number of component parts of the machine or equipment that utilizes the bearing assembly and the number of manufacturing steps be reduced, but also compactization can be achieved. In such case, since the rotation detecting apparatus is compact in size and can provide the rotation angle output with high precision, a satisfactory rotation angle output can be obtained even in a small sized bearing assembly such as, for example, a small diameter bearing.

The rotation detecting apparatus according to a second aspect of the present invention includes a magnetic sensor array including a plurality of sensor elements, a magnetic generating element rotatable in face-to-face relation with the magnetic sensor array and having an anisotropy in a direction circumferentially about an axis of rotation thereof, and a read-out circuit for sequentially selecting and driving a plurality of the sensor elements forming the magnetic sensor array, extracting a signal component from an electric current flowing the sensor element, converting it into a voltage and reading the voltage. According to this construction, since the plural magnetic sensor elements forming the magnetic sensor array are sequentially selected and the signal is read out by the read-out circuit, the amount of an electric current to be supplied to the sensor arrays suffices to be that required by one sensor element. For this reason, a large detection signal can be outputted with a minimized electric power consumption.

In the present invention, the read-out circuit for converting into and read out the voltage may have a circuit configuration constructed of a switched-current system for extracting a differential current component. In the case of this construction, change of the minute sensor current generated by external magnetic fields can be extracted leaving only the differential current component.

The read-out circuit for converting into and read out the voltage may have a circuit configuration constructed of a current mirror system for extracting a differential current component. Even in the case of this construction, change of the minute sensor current generated by external magnetic fields can be extracted leaving only the differential current component.

The read-out circuit for converting into and read out the voltage may include an integrating circuit utilizing a capacitor, the integrating circuit being operable to convert the differential current component, which is a signal component extracted from the electric current flowing, into a voltage. In the case of this construction, the voltage signal of a sufficient amplitude necessary for the A/D conversion and the signal processing in the subsequent stage can be obtained. In addition, by properly setting the capacitance of the capacitor of the current integrating circuit, it is possible to achieve the conversion into the large voltage signal in an extremely short time of charging and the sensor signal read-out circuit having a high speed and a sufficient amplification factor can be constructed.

The magnetic array sensor circuit of the present invention is operable to process an output from a magnetic sensor array including a plurality of magnetic sensor elements arranged in an array, and includes a regulating circuit for reducing an offset variation of the output from the magnetic sensor elements arranged in the array.

According to this construction, thanks to the regulating circuit, the offset variation of the outputs from the magnetic sensor elements arranged in an array can be reduced. For this reason, it is possible to achieve a highly precise detection with minimized offset variation and the quality of the output signal of the sensor array can be increased. For example, where the magnetic array sensor circuit is applied in, for example, the rotation detecting apparatus, it is possible to increase the quality of the output signal from the magnetic sensor array to thereby secure the precision of detection of the rotational angle.

In the magnetic array sensor circuit of the present invention, the regulating circuit referred to above may include a control circuit for operating the magnetic sensor element in a linear region.

In the case of this construction, by allowing the magnetic sensor elements to operate in the linear region, the offset variation of the magnetic sensor elements can be reduced, and by the utilization of a reference sensor so that a reference offset value can counterbalance them, offsets in the magnetic array sensor circuit and influences brought about by change in environment can be removed. In other words, variation of the output signal from the sensor array can be suppressed and undesirable reduction in detecting performance which would otherwise be brought about by the change in environment can be minimized. For those reason, by applying the magnetic array sensor circuit is applied to, for example, the rotation detecting device, the variation of the output signal of the magnetic sensor array can be suppressed to increase the rotational angle detecting precision and, at the same time, reduction in performance of the rotational angle detection resulting from the change in environment can also be minimized.

In the magnetic array sensor circuit of the present invention, the magnetic sensor elements may be employed in the form of a magnetic transistors, each having two drain terminals, in which case the control circuit causes the magnetic sensor elements to operate in the linear region while respective voltages at the two drain terminals of the magnetic sensor element are rendered to be at the same potential. The magnetic transistor referred to above may be a magnetic transistor of a field effect type (MAGFET). This type of magnetic transistor, when under a condition in which the gate voltage is fixed, the drain voltage is lowered to allow the operating condition of the magnetic transistor to shift from that in a saturated region to that in a linear region, results in reduction of the offset variation. In order to realize this phenomenon, it is necessary to maintain the respective voltages at the two drain terminals of the magnetic transistor at the same potential as far as possible. Accordingly, by the use of the control circuit having a function of maintaining the drain terminal voltages at the same potential without relying on the electric current flowing, it is possible to realize the circuit capable of read out the signal while suppressing the offset variation.

The control circuit for rendering the two drain terminal voltages to be the same potential may be of, for example, a circuit configuration capable of detecting two drain terminal voltages and performing a feedback so that the two drain terminals can be held at the same potential. For such control circuit, the control circuit including a full differential amplifier circuit or a single-ended amplifier circuit can be employed suitably. In either one of the full differential amplifying circuit and the single-ended amplifier circuit, the drain terminals can be held at the same potential owing to the feedback referred to above. Where the control circuit includes the single-ended amplifier circuit, the control circuit may be of a type in which an offset within the amplifying circuit can be compensated for by an offset compensating circuit made up of a switch and a capacitor.

In the magnetic array sensor circuit of the present invention, the regulating circuit referred to above may include a reference sensor element in the form of the magnetic sensor element short-circuited between two output terminals, a storage element for storing a sensor signal, read out from the reference sensor element by selecting the latter, as a reference offset value, and a subtraction circuit for subtracting the stored reference offset value from an output of the other magnetic sensor elements, whereby an offset and drift of the magnetic array sensor circuit in its entirety are eliminated by this subtraction.

According to this construction, since the two output terminals of the reference sensor element are short-circuited with each other and, hence, no offset occur, only an offset error generated inside the read-out circuit comprised of the amplifying circuit or the like can be extracted and appear in the output. This offset error is stored as a reference offset value and is subtracted from the output of each of the other magnetic sensor elements. Accordingly, even though the circuit condition of the magnetic array sensor circuit and the magnetic sensor elements forming the magnetic sensor array changes with change of temperature, the offset error of the circuit can be measured each time it occurs so that the actual sensor signal can be corrected and, therefore, it is possible to secure the output signal stable enough to be hardly affected by the environmental influence.

Also, the reference offset value storage element referred to above may be of a type capable of storing the reference offset value in the form of a A/D converted digital value, and the subtraction circuit referred to above may be of a type capable of performing subtraction from the output of each of the magnetic sensor element using a digital value. Again, the reference offset value storage element may be a capacitor for storing the reference offset value in the form of an analog voltage and the subtraction circuit may be an analog subtraction circuit.

In addition, storage of the offset value may be carried out each time a signal of one line of the sensor array is read out, thereby cancelling a drift of the circuit resulting from change in environment.

In this way, subtraction, that is, cancellation, of the offset error can be accomplished depending on the circuit condition at the time of each line read-out and, therefore, the output signal stable enough to be hardly affected by the environmental influence can be obtained.

The rotation detecting apparatus according to a third aspect of the present invention includes a magnetic sensor array including a plurality of magnetic sensor elements arranged in an array, a magnet rotatable in face-to-face relation with the magnetic sensor array, and a magnetic array sensor circuit for calculating a rotation angle of the magnet relative to the magnetic sensor array from an output of the magnetic sensor array. The magnetic array sensor circuit referred to above is that of the present invention.

According to this construction, by operating the magnetic sensor elements forming the magnetic sensor array in the linear region, it is possible to reduce the offset variation of the magnetic sensor elements. Yet, the influence brought about by the environmental change and the offset occurring in the magnetic array sensor circuit can also be eliminated. As a result, the angle detecting accuracy of the rotation detecting device can increase and the resolution and precision as a rotary encoder can also increase.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 13A is a circuit diagram showing one example of a signal read-out circuit used in the rotation detecting apparatus according to the second embodiment of the present invention;

FIG. 13B is a timing chart showing the operation of the signal read-out circuit according to the second embodiment of the present invention;

DESCRIPTION OF THE PREFERRED EMBODIMENTS

Figure 1:
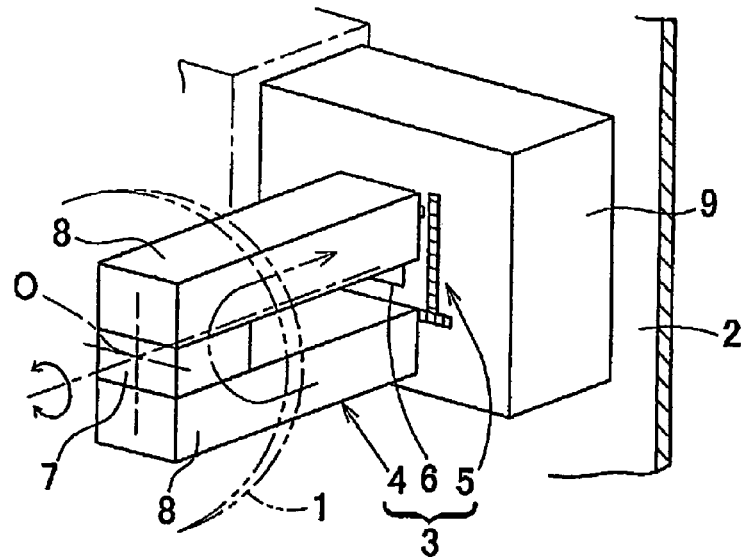
FIG. 1 is a perspective view showing a schematic structure of a rotation detecting apparatus according to a first preferred embodiment of the present invention.

A rotation detecting apparatus according to a first preferred embodiment of the present invention will be described with reference to the accompanying drawings. FIG. 1 illustrates the principle of the rotation detecting apparatus according to the first embodiment of the present invention. A rotatable member 1 and a non-rotatable member 2 represent, respectively, members on rotatable and non-rotatable sides that rotate relative to each other and, more specifically, the rotatable member 1 is represented by a rotating raceway ring of a bearing assembly and the non-rotatable member 2 is represented by a stationary raceway ring of the bearing assembly. This rotation detecting apparatus 3 includes a magnet 4, which forms a magnetic generating element arranged on the rotatable member 1, a magnetic sensor array 5 arranged on the non-rotatable member 2, and an angle calculating unit 6 for calculating the rotation angle of the magnet 4 from an output of the magnetic sensor array 5. The magnetic sensor array 5 is disposed spaced a slight distance from the magnet 4.

The magnet 4 is of a kind, in which a magnetism emanating therefrom has an anisotropy in a direction circumferentially about a rotation axis O of the rotatable member 1, and is in the form of either a permanent magnet or a complex made up of a permanent magnet and a magnetic material. In the illustrated instance, the magnet 4 is of a simple and robust structure including a single permanent magnet 7 sandwiched by and integrated with two magnetic yokes 8 and 8 to render the assembly to represent a generally U-shaped configuration, in which one of the magnetic yokes 8 has one end polarized to an N pole and the other of the magnetic yokes 8 has one end polarized to an S pole. This magnet 4 is fitted to the rotatable member 1 with its longitudinal axis aligned with the rotation axis O of the rotatable member 1 and, accordingly, the N and S poles turn around the rotation axis O as the rotatable member 1 rotates.

Figure 2:
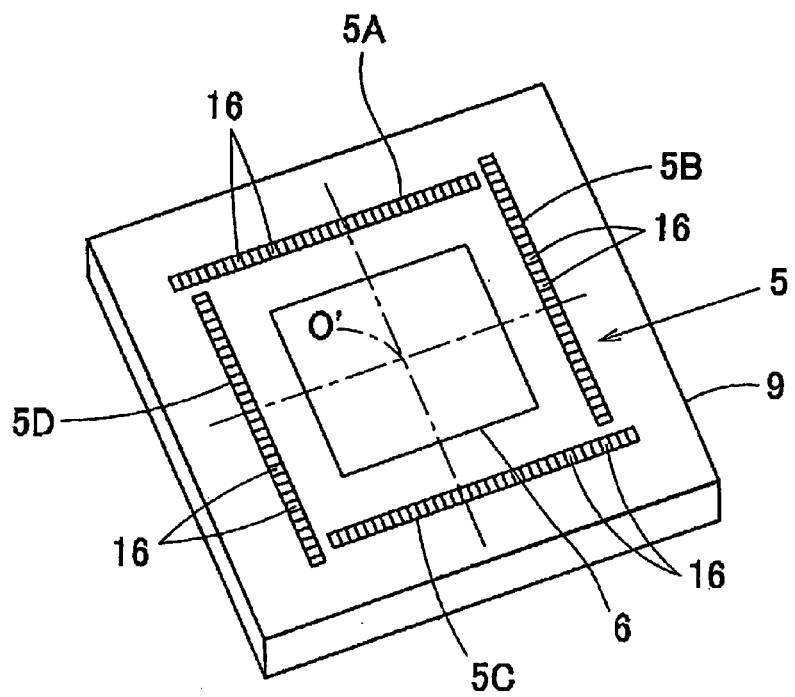
FIG. 2 is a perspective view showing a semiconductor chip used in the rotation detecting apparatus according to the first embodiment of the present invention.

The magnetic sensor array 5 is a sensor for detecting the magnetism emanating from the magnet 4 and is arranged on the non-rotatable member 2 so as to confront the magnet 4 in a direction along the rotation axis O of the rotatable member 1. As shown in FIG. 2, the magnetic sensor array 5 is arranged on a single semiconductor chip 9 so as to occupy four sides of an imaginary square shape, with the center O' of such imaginary square shape aligned with the rotation axis O of the rotatable member 1.

Figure 4:
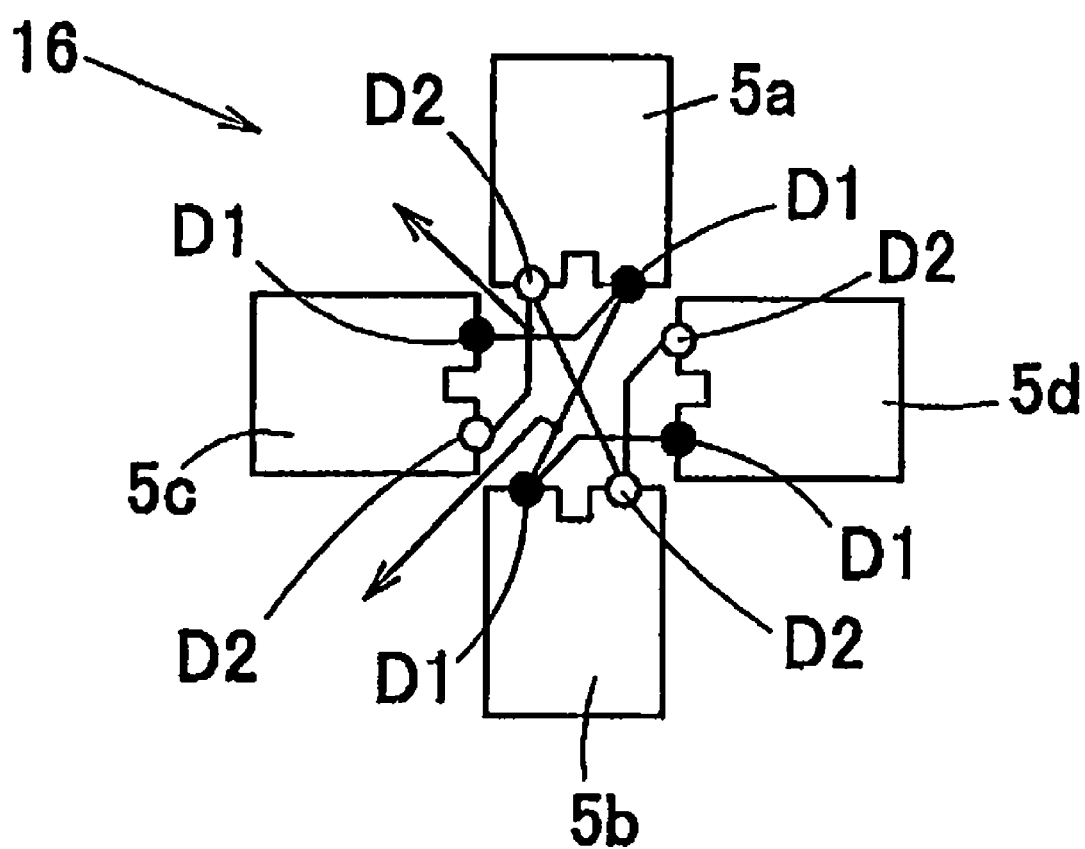
FIG. 4 is a plan view showing an example of a group of sensor elements used to form a magnetic sensor array in the rotation detecting apparatus according to the first embodiment of the present invention.

As shown in FIG. 4, a magnetic sensor component forming each of sensor trains 5A to 5D is made up of a combined sensor element group 16 including four sensor elements 5a to 5d. The four sensor elements 5a to 5d of each combined sensor element group 16 are so arranged as to be oriented vertically and horizontally in four directions and are connected parallel to each other. In such case, of two drain terminals D1 and D2 of each of the sensor elements 5a to 5d, the first drain terminals D1 (represented by the black circle) are connected with each other and the second drain terminals D2 (represented by the white circle) are connected with each other. Each of the sensor trains 5A to 5D is made up of a plurality of the combined sensor element groups 16 lined up in one direction and each combined sensor element group 16 is regarded and handled as one sensor device in each of the sensor trains 5A to 5D.

The semiconductor chip 9, which has a surface mounted with the sensor array 5 as described above, is fitted to the non-rotatable member 2 with the sensor-mounted surface confronting the magnet 4. The semiconductor chip 9 referred to above is in the form of a silicon chip.

Figure 5A:
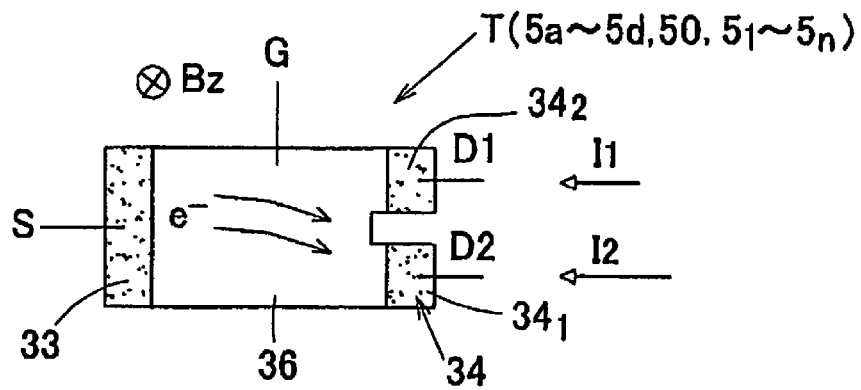
FIG. 5A is a plan view of one of the magnetic sensor elements used in the rotation detecting apparatus according to the first embodiment of the present invention.
Figure 5B:
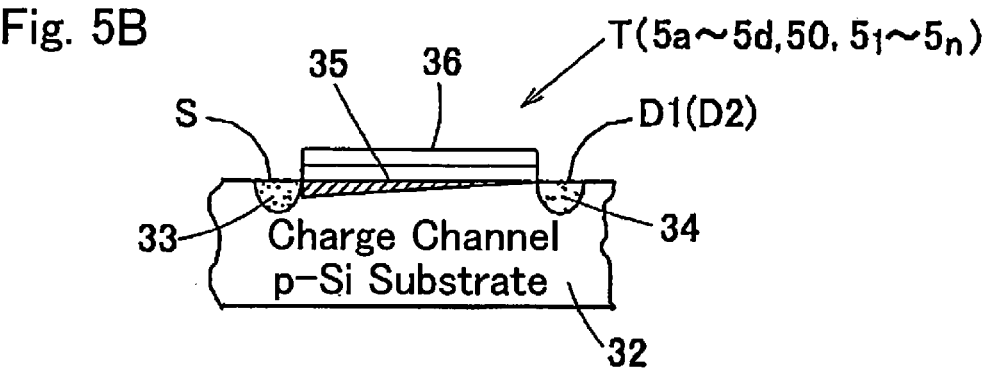
FIG. 5B is a sectional view of the magnetic sensor element used in the rotation detecting apparatus according to the first embodiment of the present invention.
Figure 5C:
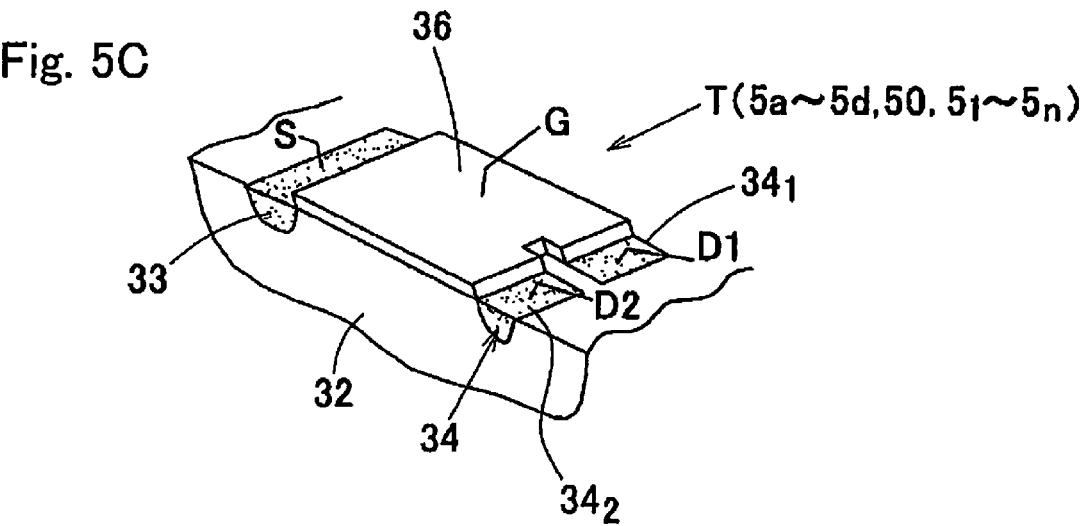
FIG. 5C is a perspective view of the magnetic sensor element used in the rotation detecting apparatus according to the first embodiment of the present invention.

For each of the magnetic sensor elements 5a to 5d, a magnetic transistor of a field effect type (MAGFET) or a Hall element can be used, while the illustrated embodiment will be described in detail with the magnetic transistors (MAGFETs) employed therein. FIGS. 5A to 5C illustrate the structure of each of the magnetic sensor elements 5a to 5d shown in plan, sectional and perspective representations, respectively. Each magnetic sensor element 5a to 5d is in the form of a MAGFET (a magnetic transistor T of a field effect type) and has a gate electrode 36 positioned, through an oxide layer 35, between a source region 33 and a drain region 34, both of the regions formed on a surface layer of a p-Si substrate 32. The drain region 34 is divided into two segments $34_1$ and $34_2$ spaced apart from each other, with the drain terminals D1 and D2 defined in the respective drain segments $34_1$ and $34_2$.

In this magnetic sensor element 5a to 5d, since the Lorentz force acts on electrons e⁻ flowing from the source region 33 towards the drain region 34 and the electric currents $I_1$ and $I_2$ flowing in the respective two drain terminals D1 and D2 vary with the intensity of the magnetic field Bz, the intensity of the magnetic field Bz applied to the respective sensor element 5a to 5d can be detected.

In a semiconductor circuit formed in a silicon wafer, due to various factors involved in the process of manufacturing thereof, the presence of variation in characteristics of elements is unavoidable. In the sensor element 5a to 5d such as shown in FIG. 5, it is ideal that the respective amounts of the drain currents $I_1$ and $I_2$ are equal to each other in the absence of the magnetic field, but in practice, an offset signal appears in small amounts for each element. Where outputs of a plurality of sensor components arranged in an array are used to determine a distribution of the magnetic field emanating from a magnet arranged in face-to-face relation therewith and the rotational angle is calculated in reference to the magnetic field distribution, the offset signals generated by those components will serve as noise in the magnetic field distribution and will therefore lower the angle detecting accuracy.

Of those offset signals, the offset signal resulting from stresses in the sensor chip that causes the reduction of the angle detecting accuracy can be avoided in a manner as will be described later when the sensor elements 5a to 5d oriented vertically and horizontally in four directions are connected parallel to each other to define the respective combined sensor element group 16.

The angle calculating unit 6 shown in FIG. 1 is in the form of an integrated circuit and is, as shown in FIG. 2, mounted on the semiconductor chip 9 together with the magnetic sensor array 5. This angle calculating unit 6 is arranged inside the square shape depicted by the magnetic sensor array 5. Accordingly, it is possible to arrange the magnetic sensor array 6 and the angle calculating unit 6 compactly.

Figure 3:
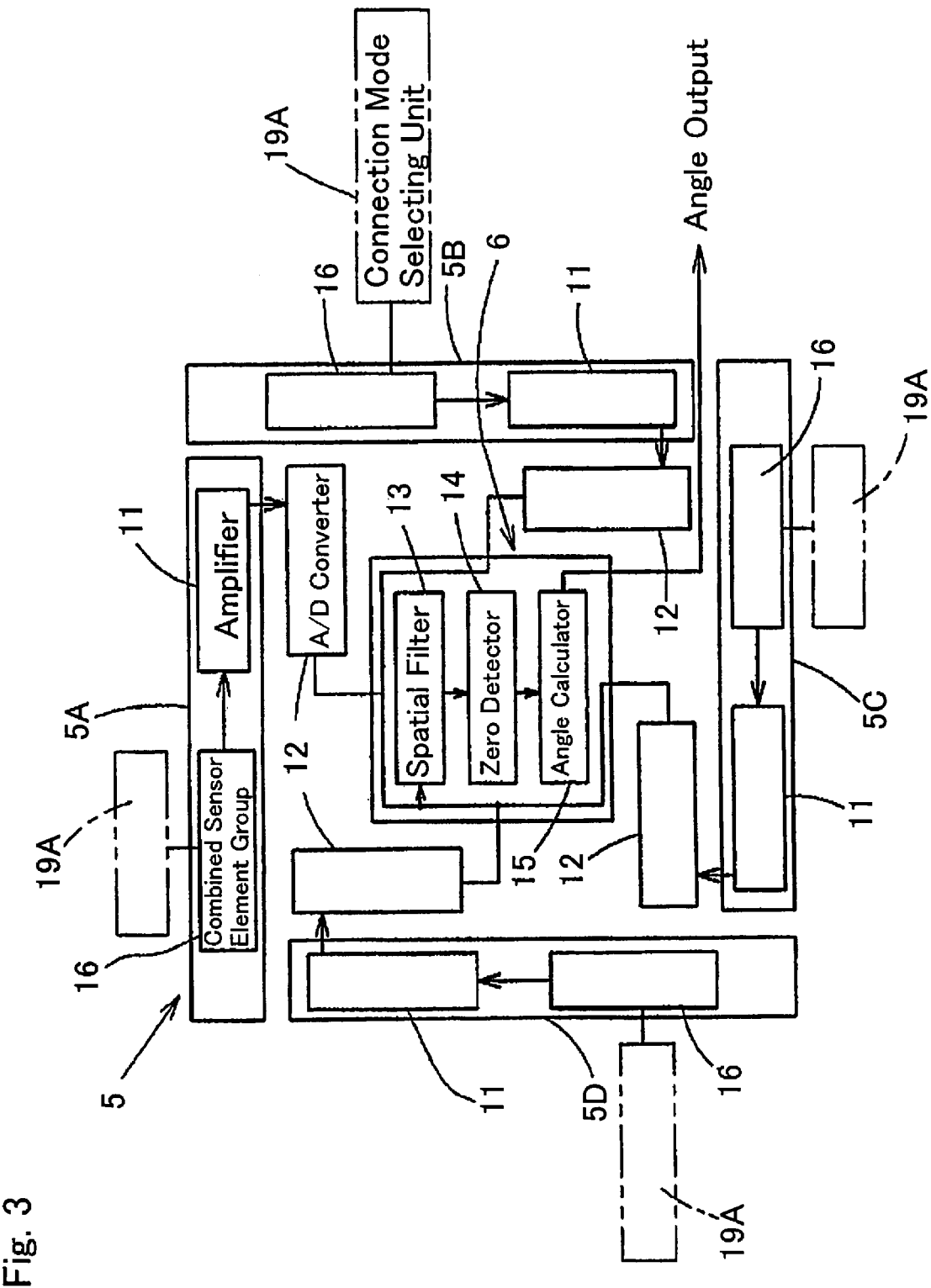
FIG. 3 is a circuit block diagram showing an electric circuit formed on the semiconductor chip of the rotation detecting apparatus according to the first embodiment of the present invention.

FIG. 3 illustrates a schematic structure of a circuit on the semiconductor chip 9 that is applicable where the angle calculating unit 6 is so designed as to provide an absolute output. In addition to the arrangement of the combined sensor element groups 16, each of the sensor trains 5A to 5D includes an amplifier 11 for amplifying an output from the respective sensor train 5A to 5D. Also, an A/D converter 12 for converting an analog output, which has been amplified by the corresponding amplifier 11, into a digital output is connected between each sensor train 5A to 5D and the angle calculating unit 6. The angle calculating unit 6 includes a spatial filter 13 for removing noises from the digital output of the A/D converter 12, a zero detector 14 for detecting a zero-crossing in the magnetic field distribution from an output of the spatial filter 13 and an angle calculator 15 for calculating the rotation angle of the magnet 4 from an output of the zero detector 14. The spatial filter 13 referred to above has a function of reducing noises resulting from variation in sensors by digitally filtering the output from the magnetic sensor array 5 and may be employed in the form of a comb filter.

Figure 6:
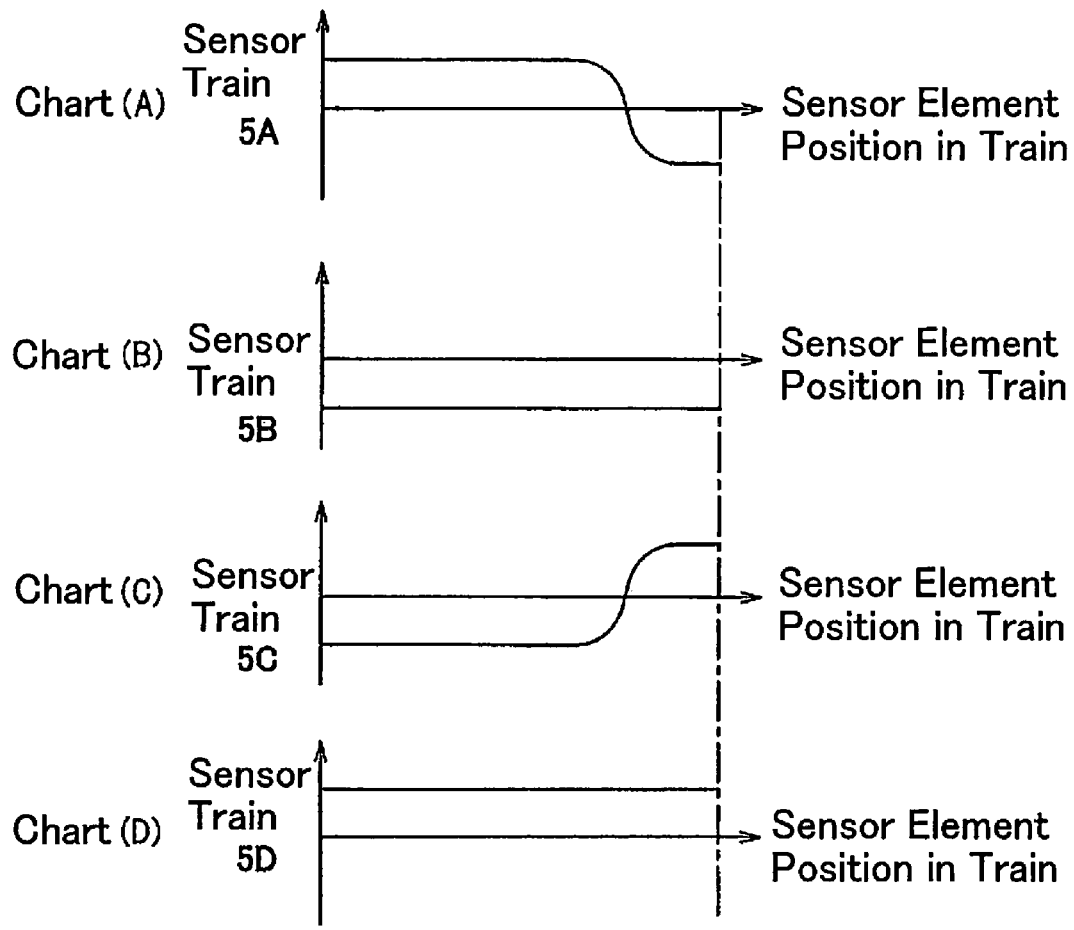
FIG. 6 is a diagram showing Charts of waveforms of respective outputs from the magnetic sensor elements forming the magnetic sensor array.
Figure 7:
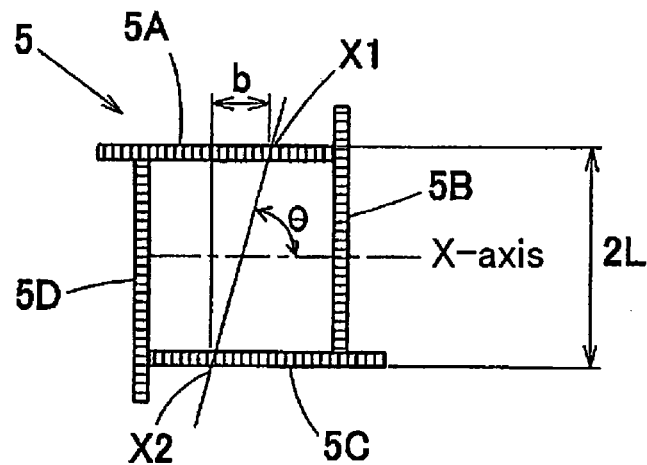
FIG. 7 is a schematic diagram showing a process of calculating the angle that is performed by an angle calculating unit.

FIGS. 6 and 7 show respective explanatory diagrams used to explain the angle calculating process performed by the angle calculator 15. In particular, Charts (A) to (D) in FIG. 6 show waveforms of respective outputs from the magnetic sensor trains 5A to 5D forming the magnetic sensor array 5, which are generated during rotation of the rotatable member 1, in which the axis of abscissas represents each combined sensor element group 16 of each of the sensor trains 5A to 5D and the axis of ordinates represents the intensity of the detected magnetic field.

Let it be assumed that the zero-crossing positions, which indicate a boundary between the N and S poles of the magnetic field, detected by the magnetic sensor array 5 lie at respective positions X1 and X2 shown in FIG. 7. In this condition, outputs from the sensor trains 5A to 5D of the magnetic sensor array 5 represent such signal waveforms as shown in Charts (A) to (D), respectively. Accordingly, the zero-crossing positions X1 and X2 can be calculated from the respective outputs of the sensor trains 5A and 5C by means of collinear approximation.

Calculation of the angle can be carried out by use of the following equation (1):

$$\theta = \tan^{-1}(2L/b) \quad (1)$$

wherein θ represents the value of the rotation angle θ of the magnet 4 expressed in terms of the absolute angle; 2L represents the length of each of the four sides of the magnetic sensor array 5 made up of the sensor trains 5A to 5D arranged in the square pattern; and b represents the transverse length between the zero-crossing positions X1 and X2.

If the zero-crossing positions X1 and X2 lie in the sensor trains 5B and 5D, the rotation angle θ can be calculated in a manner similar to that described above, based on data on the zero-crossing positions obtained from the respective outputs of those sensor trains 5B and 5D.

The magnetic sensor elements 5a to 5d forming each of the combined sensor element groups 16 in the magnetic sensor array 5 are connected parallel to each other in the manner shown in and described with reference to FIG. 4. Because of this, it is possible to reduce the influence brought about by the stress, where the stress acts on the semiconductor chip 9 in a direction shown by the arrow S in FIG. 8A, accompanied by an imbalance in resistivity. In other words, since the four sensor elements 5a to 5d are so arranged as to be oriented vertically and horizontally in four directions, the sensor elements 5a to 5d are so oriented as to be displaced 90° from each other. In those sensor elements 5a to 5d so displaced 90° from each other, the effects of stresses are reversed. As such, by arranging the four sensor elements 5a to 5d forming each of the combined sensor element groups 16 in the magnetic sensor array 5 so as to be oriented vertically and horizontally in four directions and by connecting parallel to each other to thereby form the respective combined sensor element group 16 as hereinbefore described, the respective offset signals of the sensor elements 5a to 5d resulting from the warp occurring in the semiconductor chip 9 can be reduced in the magnetic signal outputted from the magnetic sensor array 5.

Figure 8A:
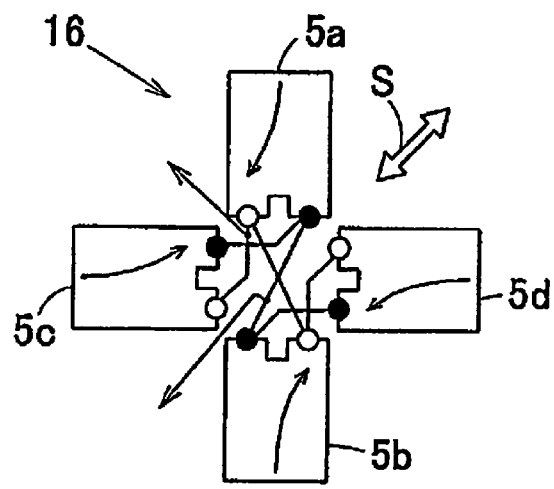
FIG. 8A is a circuit diagram showing the flow of an electric current incident to a stress in the combined sensor element group.
Figure 8B:
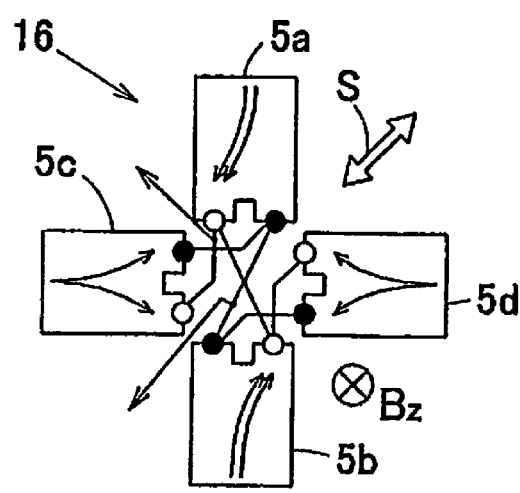
FIG. 8B is a circuit showing the flow of the electric current occurring when a magnetic field is applied to the combined sensor element group in FIG. 8A.

When during the condition shown in FIG. 8A, the magnetic field Bz is further applied as shown in FIG. 8B, magnetic filed signals from the sensor elements 5a to 5d are summed together, but the offset signals resulting from the stresses are counterbalanced with each other and, accordingly, the offset signals can be reduced in a sensor signal outputted from the combined sensor element group 16.

Figure 9A:
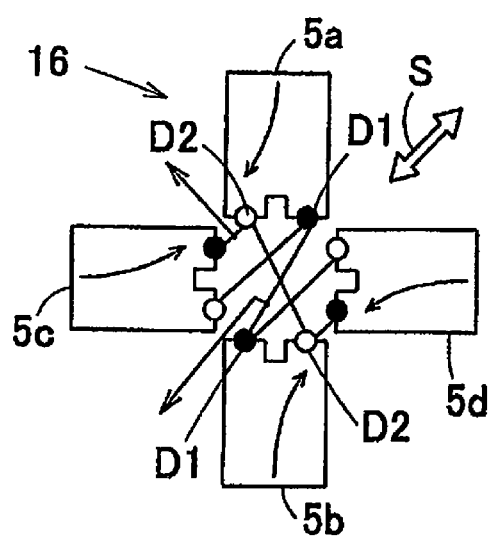
FIG. 9A is a circuit diagram showing the flow of the electric current incident to the stress in the combined sensor element group that is used in a different connection.
Figure 9B:
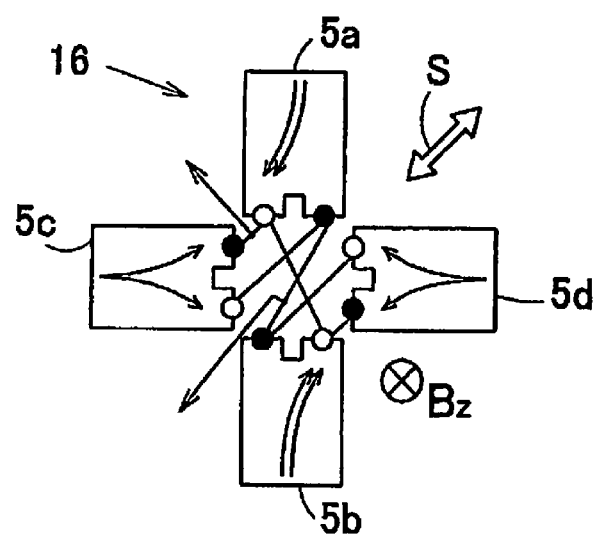
FIG. 9B is a circuit showing the flow of the electric current occurring when a magnetic field is applied to the combined sensor element group used in the different connection in FIG. 9A.

Also, where in the four magnetic sensor elements 5a to 5 forming the respective combined sensor element group 16, the mode of connection is reversed as shown in FIG. 9 to that described hereinabove, the magnetic field signals are counterbalanced and only the offset signals resulting from the stresses will be outputted. The mode of connection shown in FIG. 9 is such that the first drain terminals D1 of two of the magnetic sensor elements 5a and 5b placed in the vertical direction and the second drain terminals D2 of the remaining sensor elements 5c and 5d placed in the transverse direction are connected together. In the case of the mode of connection shown in FIG. 9, the stress signal will be outputted from the combined sensor element group 16, allowing the magnetic sensor array 5 to function as a stress sensor.

It is to be noted that the semiconductor chip 9 may be provided thereon with an additional circuit, which serves as a connection mode selecting unit 19A for selecting one of the mode of connection shown in FIG. 8 and the mode of connection shown in FIG. 9, so that the only magnetic sensor array 5 can be selectively used as a rotation sensor or a stress sensor. Selection of one of those modes of connection is preferably accomplished in response to a predetermined signal supplied from an external part.

Figure 10:
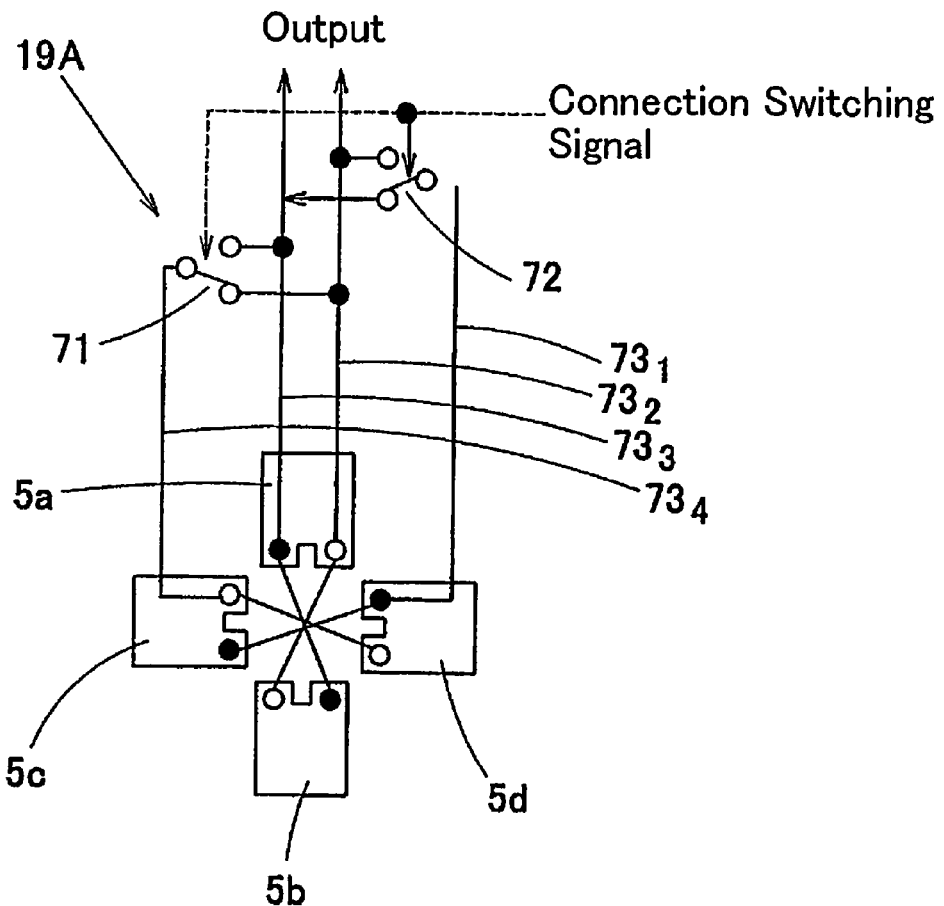
FIG. 10 is a circuit diagram showing one example of a connection switch.

FIG. 10 illustrates one example of the circuit that serves as the connection mode selecting unit 19A, which includes two selecting switches 71 and 72 operable in response to an external switching signal to change connections of wirings $73_1$ to $73_4$ which are used to connect between the magnetic sensor elements 5a to 5d. Each of the selecting switches 71 and 72 is employed in the form of a semiconductor switching element.

In addition, for the magnetic sensor array 5, the magnetic sensor array 5 including the combined sensor element groups 16 connected in the mode shown in FIG. 8 and the magnetic sensor array 5 including the combined sensor element groups 16 connected in the mode shown in FIG. 9 may be so juxtaposed relative to each other that only one of respective outputs from the magnetic sensor arrays 5 can be selected. Even in this way, the rotation sensor and the stress sensor can be selectively utilized one at a time.

As described above, according to the rotation detecting apparatus 3 of the structure described hereinabove, since the sensor elements of the magnetic sensor array 5 are formed as the combined sensor element groups 16 each including the four sensor elements and since the four sensor elements 5a to 5d forming each combined sensor element group 16 are so arranged as to be oriented vertically and horizontally in four directions and are connected parallel to each other, it is possible to reduce in the magnetic signal outputted from the magnetic sensor array 5, the offset signals of the sensor elements 5a to 5d resulting from the stress occurring in the silicon chip. As a result thereof, the angle detecting precision of the rotation detecting apparatus 3 increases and the resolution and the precision as a rotary encoder can be improved accordingly.

Also, as measures to reduce the offset signals, no change is required in the process of manufacturing of the sensor elements 5a to 5d and, accordingly, the cost will not be increased.

Yet, since in this first embodiment, the four sensor elements 5a to 5d of each combined sensor element group 16 are arranged in a cruciform pattern, the wirings necessary to connect between the sensor elements 5a to 5d are small in length and can therefore be simplified.

Figure 11A:
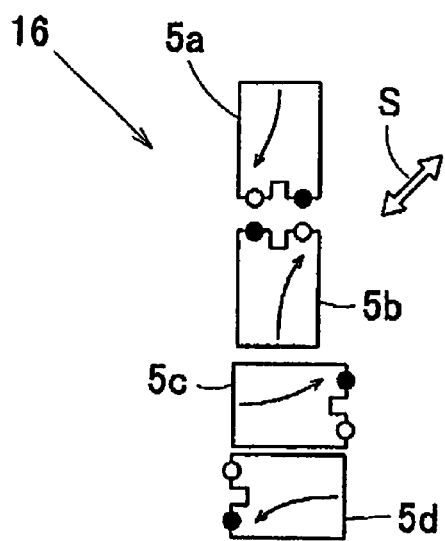
FIG. 11A is a circuit diagram showing the flow of the electric current incident to the stress in the combined sensor element group that is used in a further connection.
Figure 11B:
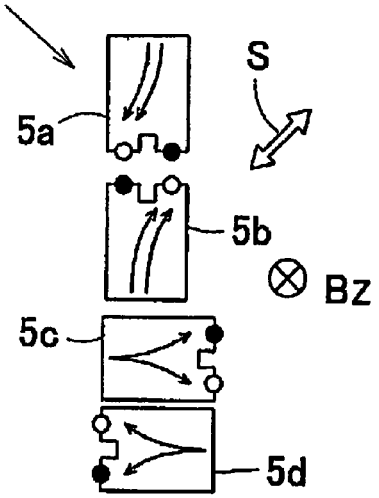
FIG. 11B is a circuit showing the flow of the electric current occurring when a magnetic field is applied to the combined sensor element group used in the further connection in FIG. 11A.

It is to be noted that although in the foregoing embodiment, the four sensor elements 5a to 5d forming each of the combined sensor element groups 16 has been shown and described as arranged in a cruciform pattern, the pattern of arrangement of the four magnetic sensor elements 5a to 5d may not be always limited to the cruciform pattern as long as the same mode of connection is employed. By way of example, as shown in FIGS. 11A and 11B, the two sensor elements 5c and 5d, which are laid transverse, may be juxtaposed in a vertical direction relative to the other two sensor elements 5a and 5b juxtaposed in the vertical direction. FIG. 11A illustrates a condition under stress and FIG. 11B illustrates a condition in which under the stress the magnetic field Bz is applied. Connection between the sensor elements 5a to 5d are not shown for the sake of brevity.

As hereinabove described, where the four sensor elements 5a to 5d of each combined sensor element group 16 are arranged dispersed, the sensor elements 5a to 5d are flexibly arranged, therefore, it is possible to efficiently arrange the sensor elements 5a to 5d with unnecessary regions being minimized in the substrate.

Figure 12:
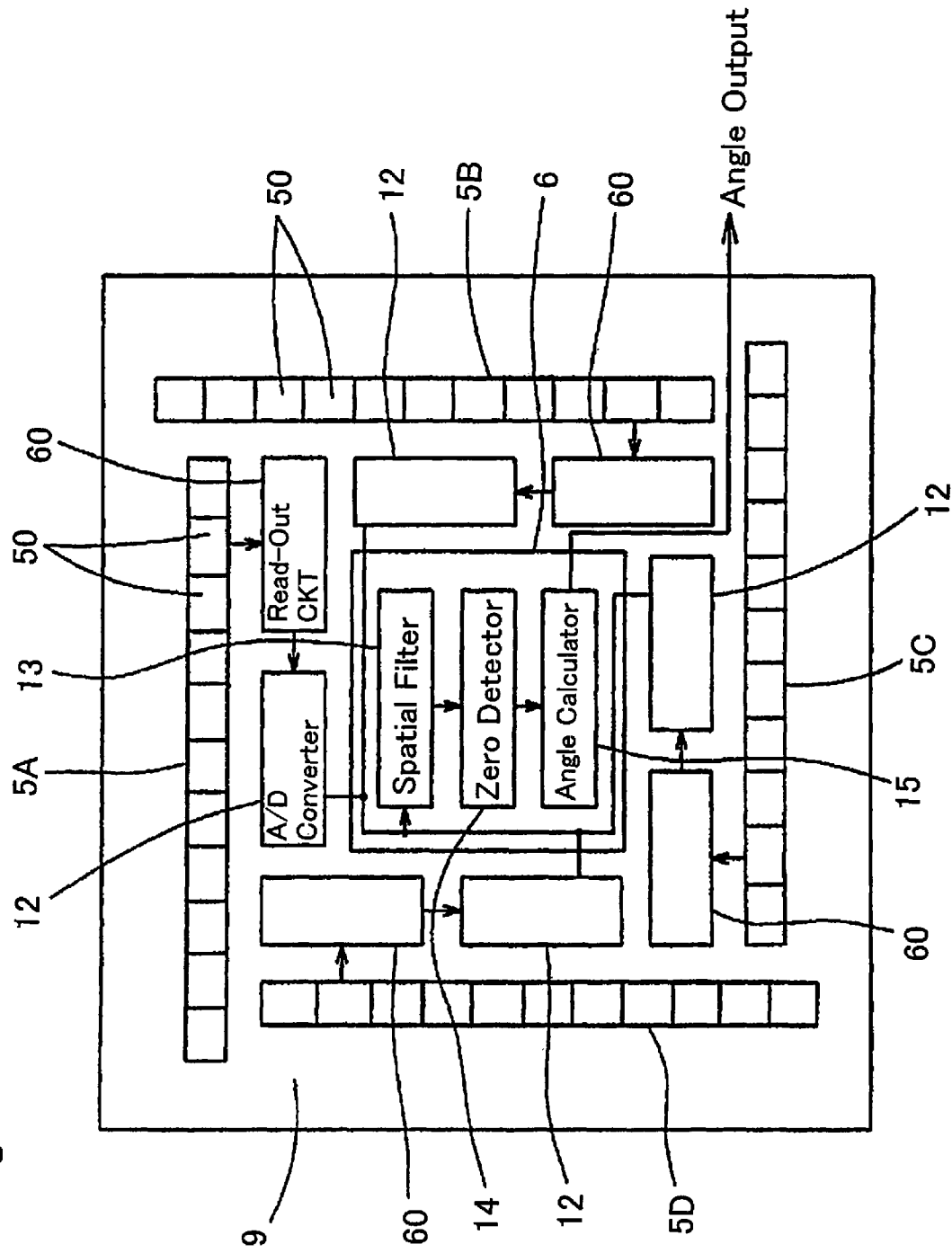
FIG. 12 is a circuit block diagram showing the electric circuit formed on the semiconductor chip of the rotation detecting apparatus according to a second preferred embodiment of the present invention.

FIG. 12 is a circuit block diagram showing the circuit formed in the semiconductor chip used in the rotation detecting apparatus according to a second preferred embodiment of the present invention.

The difference between this second embodiment and the first embodiment shown in FIG. 3 lies in that in place of the amplifier 11 employed in the first embodiment, a sensor signal read-out circuit 60 is employed. Magnetic sensor components 50 forming each of the sensor trains 5A to 5D on the four sides are of a structure identical with those shown in and described with particular reference to FIG. 5.

FIG. 13A illustrates an example of a circuit arrangement of the sensor signal read-out circuit 60. This sensor signal read-out circuit 60 includes a power supply circuit 80 and a current integrating circuit 81 and is operable to select the magnetic sensor elements (MAGFETs) 50 forming the magnetic sensor array 5 sequentially according to the order of arrangement thereof, to convert output currents thereof into corresponding voltage and finally to read out them.

The power supply circuit 80 is of a switched-current system. This power supply circuit 80 includes a series connected circuit section 82 including series-connected transistors Q1 and Q2 and connected at one end with an electric power source terminal and at the other end with a read-out line IoP, as well as a series connected circuit section 83 including series-connected transistors Q3 and Q4 and connected at one end with the electric power source terminal and at the other end with the other read-out line IoM. Respective gates of the transistors Q1 and Q3 are connected with the electric power source terminal through a bias supply capacitor Cm for bias supply and those gates and the read-out lines IoP and IoM are connected together through switches MEM and RST. The read-out line IoP and IoM referred to above are in turn connected with each of the magnetic sensor elements (MAGFETs) 50 through corresponding selector switching transistors SEL-SW.

The electric current integrating circuit 81 is in the form of a full differential amplifier circuit including an OP amplifier 84, capacitors C, and switches RST and has two input terminals connected respectively with the read-out lines IoP and IoM through switches SAM.

Hereinafter, the operation of the sensor signal read-out circuit 60 will be described. The various switches employed therein operate at respective timings shown in the timing chart in FIG. 13B. It is to be noted that in this timing chart shown in FIG. 13B, each switch is shown as triggered on when the signal is in a high level state H.

Figure 14A:
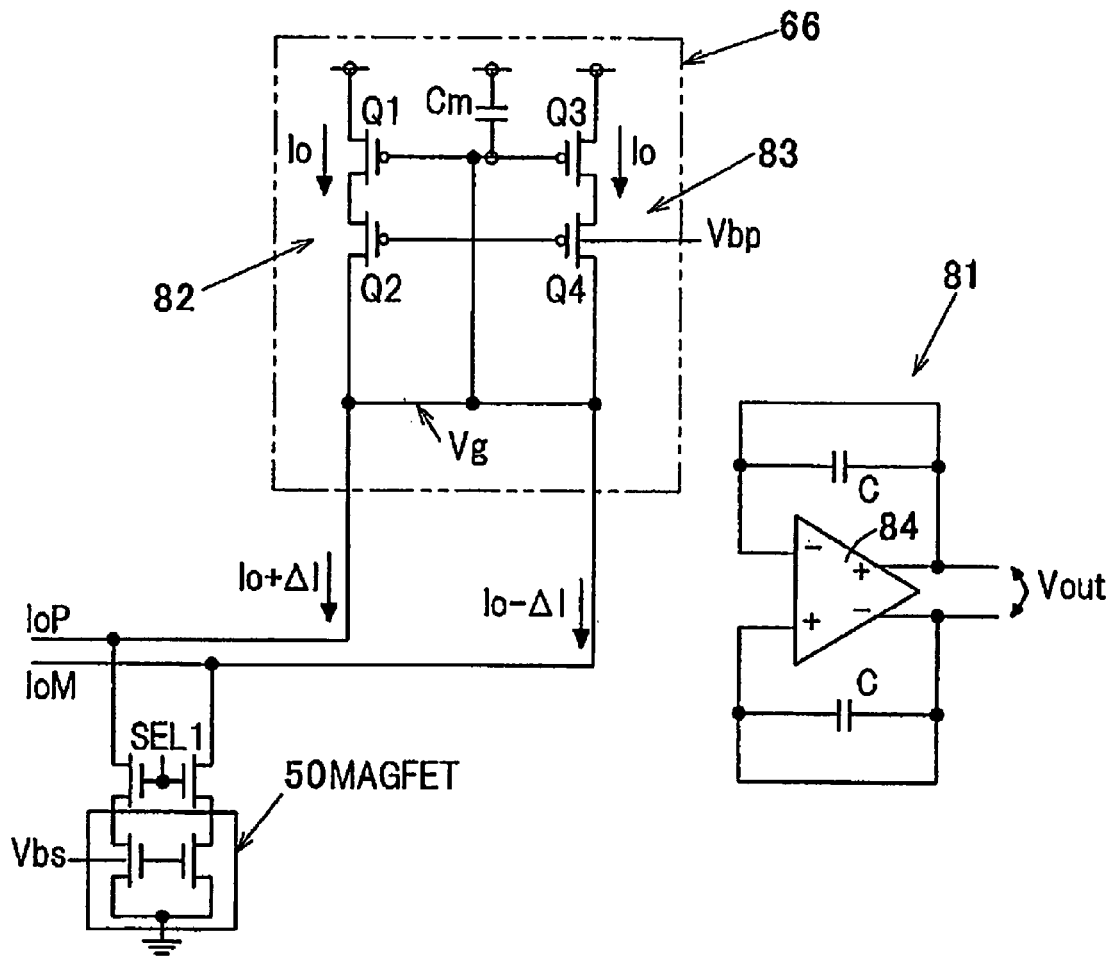
FIG. 14A is a circuit diagram showing the operation of the signal read-out circuit during selection of the sensor elements according to the second embodiment of the present invention.
Figure 14B:
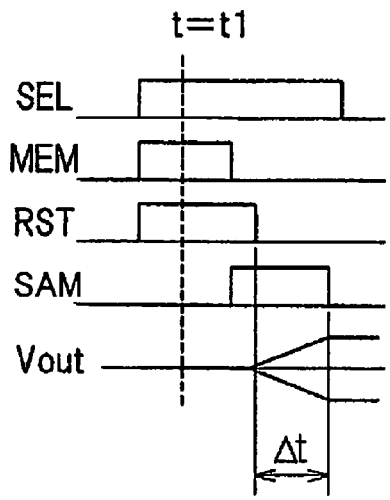
FIG. 14B is a timing chart showing the operation of the signal read-out circuit during the selection of the sensor elements according to the second embodiment of the present invention.

At the outset, a select signal SEL for selecting one of the magnetic sensor elements 50 is held in a high level state H. Then the switches MEM and RST are triggered on. The circuit under this condition is shown in FIG. 14A. The selected magnetic sensor element 50 is held by an applied bias voltage Vbs in a condition ready to flow a predetermined electric current and, in the illustrated instance, in a condition in which the sum of the electric currents at the two drain terminals is 2Io. When the magnetic field is applied to the magnetic sensor element 50, the imbalance occurs between the two drain terminal currents and electric currents Io+ΔI and Io−ΔI flow through the read-out lines IoP and IoM, respectively.

On the other hand, since the switches MEM and RST in the power supply circuit 80 are turned on, the read-out lines IoP and IoM are short-circuited. Also, since the respective gates of the transistors Q1 and Q3 are connected with the read-out lines IoP and IoM, the power supply circuit 80 is diode-connected to supply the sum 2Io of the currents flowing through the magnetic sensor elements 50. In other words, respective gate terminal voltages Vg of the transistors Q1 and Q3 become equal to potentials at the read-out lines IoP and IoM with an electric current Io flowing through the left and right series connected circuit sections 82 and 83. In the electric current integrating circuit 81, since the switch SAM is turned off, it is isolated from the power supply circuit 80 and opposite ends of the capacitor C are short-circuited through the switch RST, thereby holding a reset condition.

Important to note during this condition is that the capacitor Cm is connected to the respective gate terminals of the transistors Q1 and Q3 of the power supply circuit 80 with the gate voltage Vg stored therein. Even when starting from this condition the switch MEM is turned off, the state of the power supply circuit 80 is maintained by the voltage Vg stored in the capacitor Cm and, therefore, the electric current Io continues to flow through the left and right series connected circuit sections 82 and 83.

Figure 15A:
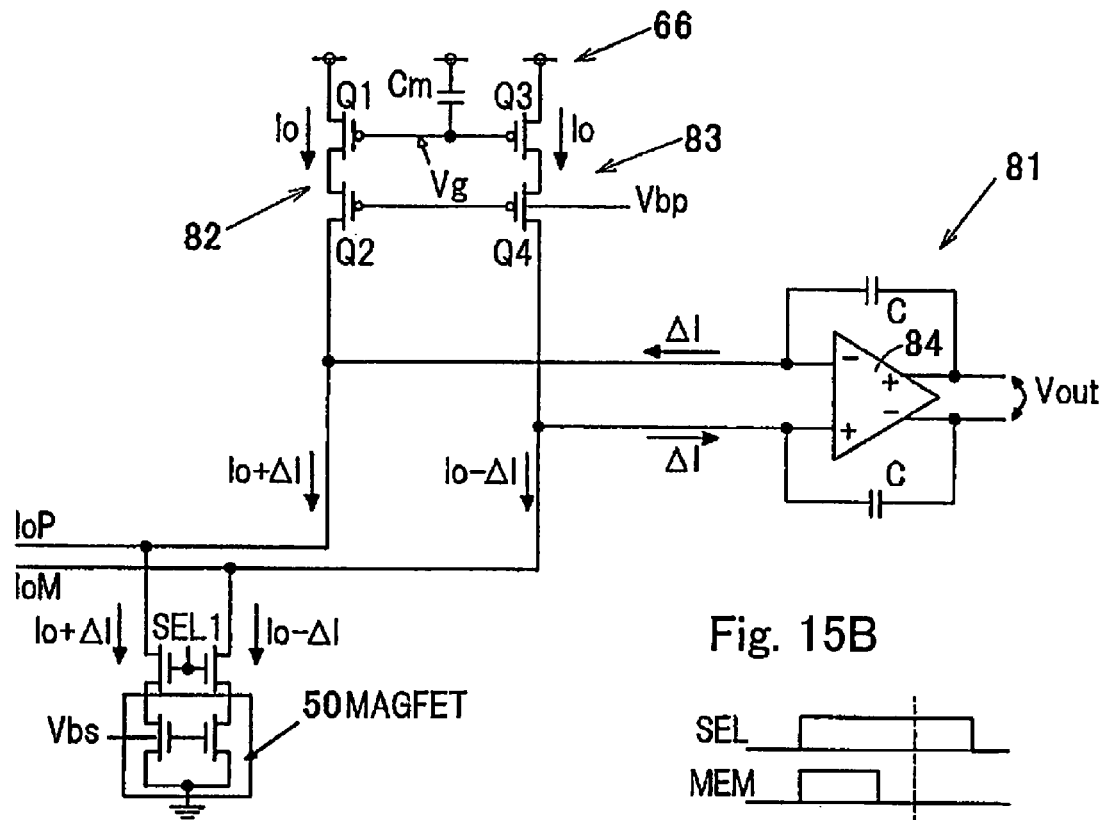
FIG. 15A is a circuit diagram showing the operation of the signal read-out circuit during signal read-out according to the second embodiment of the present invention.
Figure 15B:
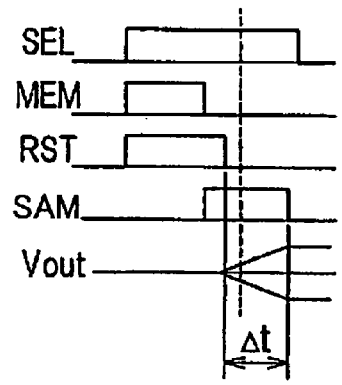
FIG. 15B is a timing chart showing the operation of the signal read-out circuit during the signal read-out according to the second embodiment of the present invention.

By turning on the switch SAM at this time, the electric current integrating circuit 81 is connected with the read-out lines IoP and IoM, and when the switch RST is subsequently turned off, a condition establishes in which the differential current is accumulated in the capacitor C. This condition is shown in FIG. 15A. As hereinabove described, although the power supply circuit 80 operated in a condition to supply the electric current Io to the left and right series connected circuit sections 82 and 83, differences +ΔI and −ΔI therebetween are supplied to the electric current integrating circuit 81 since electric currents flowing through the magnetic sensor elements are Io+ΔI and Io−ΔI. The electric current integrating circuit 81 starts the accumulating operation thereof when and after the switch RST is turned off and terminates it when the switch SAM is turned off. By controlling the length of time Δt during which charging takes place, the voltage Vout outputted can be controlled.

In other words, by carrying out the integration for a period of Δt, a voltage expressed by the following equation (2) can be generated:

$$Vout = 2 \times \Delta t \times \Delta I / C \tag{2}$$

Figure 16:
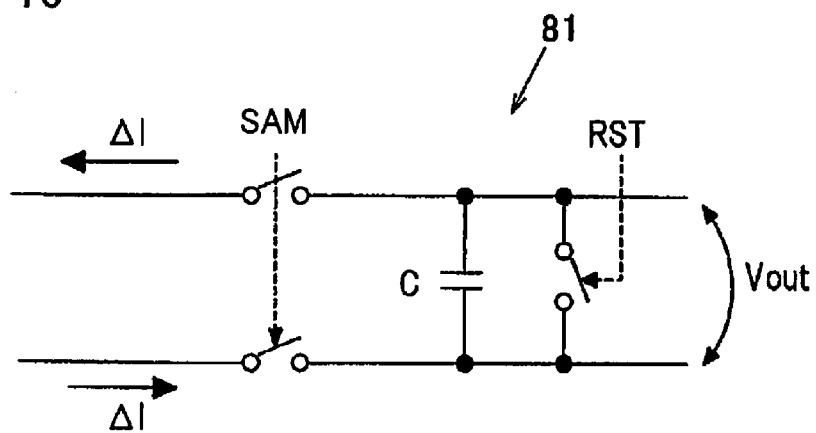
FIG. 16 is a circuit diagram showing one example of an integrating circuit used in the signal read-out circuit according to the second embodiment of the present invention.

When the minute differential current ΔI is 1 μA, the voltage Vout of 1 volt is obtained by setting the capacitor C to 1 pF and Δt to 0.5 μs. It is to be noted that in FIG. 13A, the current integrating circuit 81 is shown as employed in the form of the full differential amplifier circuit, but it may alternatively have a circuit configuration operable to merely charge on the capacitor C as shown in FIG. 16.

As described above, since in the rotation detecting apparatus 3 according to this embodiment, the provision is made of the sensor signal read-out circuit 60 operable to sequentially select the plural magnetic sensor elements 50 forming the magnetic sensor array 5, to extract a signal component from the flowing electric current and to read out it after having been converted into the voltage, the electric current to be supplied to the magnetic sensor elements 50 may be of an amount required by one component. For this reason, the detection signal can be read out while the current consumption is minimized.

In this embodiment, since the power supply circuit 80 of the sensor signal read-out circuit 60 is chosen to be of the switched-current system, a change of the minute sensor current caused by external magnetic field can be extracted purely in the form of a differential current component. Also, since the extracted differential current component is converted into an electric voltage signal by means of the electric current integrating circuit 81 utilizing the capacitor C to perform charging for a predetermined length of time, the voltage signal of a sufficient amplitude necessary for the A/D conversion and the signal processing in the subsequent stage can be obtained. In addition, by properly setting the capacitance of the capacitor of the current integrating circuit 81, it is possible to achieve the conversion into the large voltage signal in an extremely short time of charging and to construct the sensor signal read-out circuit 60 having a high speed and a sufficient amplification factor.

Figure 17:
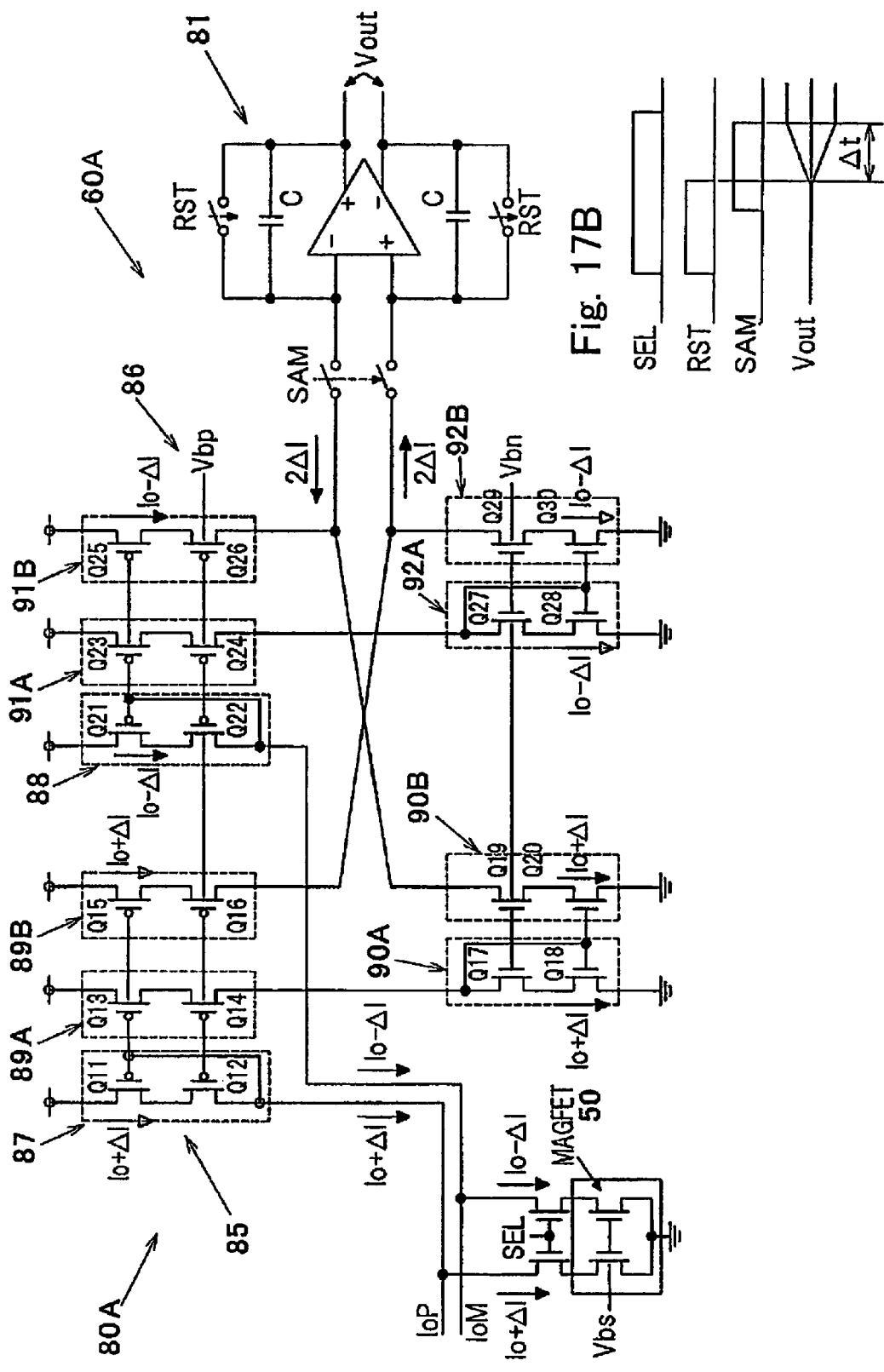
FIG. 17A is a circuit diagram showing a modified signal read-out circuit according to the second embodiment of the present invention.
FIG. 17B is a timing chart showing the operation of the modified signal read-out circuit according to the second embodiment of the present invention.

A different example of the circuit construction of the sensor signal read-out circuit 60 referred to above is shown in FIG. 17A. In this sensor signal read-out circuit 60A, the details of connection between the magnetic sensor elements 50 and the read-out lines IoP and IoM and the details of the current integrating circuit 81 are substantially identical with those shown in and described with particular reference to FIG. 13A. However, the sensor signal read-out circuit 60A shown in FIG. 17A differs from that shown in FIG. 13A in that the power supply circuit 80A employed therein is of a current mirror type. In other words, the power supply circuit 80A of the sensor signal read-out circuit 60A shown in FIG. 17A includes a first circuit section 85, connected with the read-out line IoP, and a second circuit section 86 connected with the read-out line IoM.

The first circuit section 85 includes a diode-connected pMOS circuit 87 including transistors Q11 and Q12 interposed between the electric power source terminal and the read-out line IoP, and current mirror circuits 89A, 89B, 90A and 90B. The current mirror circuit 89A and 89B respectively include transistors Q13, Q14 and transistors Q15, Q16 having their gates connected with respective gates of the transistors Q11, Q12 of the pMOS circuit 87 and are connected at one end with the electric power source terminals. The current mirror circuits 90A and 90B are of an nMOS circuit construction including transistors Q17, Q18 and transistors Q19, Q20 interposed between the opposite ends of the current mirror circuits 89A and 89B and the ground terminals, respectively.

The second circuit section 86 includes a diode-connected pMOS circuit 88 including transistors Q21 and Q22 interposed between the electric power source terminals and the read-out line IoM, and current mirror circuits 91A, 91B, 92A and 92B. The current mirror circuit 91A and 91B respectively include transistors Q23, Q24 and transistors Q25, Q26 having their gates connected with respective gates of the transistors Q21 and Q22 and connected at one end with the electric power source terminals. The current mirror circuits 92A and 92B are of an nMOS circuit construction including transistors Q27, Q28 and transistors Q29, Q30 interposed between the opposite ends of the current mirror circuits 91A and 91B and the ground terminals, respectively.

The current mirror circuit 89B is connected at the opposite end with the opposite end of the current mirror circuit 92B, and the current mirror circuit 90B is connected at the opposite end with the opposite end of the current mirror circuit 91B. The opposite ends of the current mirror circuits 91B and 92B are each connected with the electric current integrating circuit 81 through the switch SAM. The various switches employed in this circuit operate at respective timings shown in the timing chart of FIG. 17B.

In the above described circuit, the pMOS circuits 87 and 88 are held in a condition to supply an electric current flowing towards the magnetic sensor element 50 that has been selected and are operable to supply the electric currents Io+ΔI and Io−ΔI, respectively. The current mirror circuits 89A, 89B and 91A, 91B respectively connected with those circuits 23 and 24 serve as current source circuits capable of generating the same electric currents as those flowing towards the pMOS circuits 87 and 88. Similarly, the current mirror circuits 90A, 90B, 92A and 92B connected with the current mirror circuits 89A, 89B, 91A and 91B serve as current source circuits capable of generating the same electric currents. The current integrating circuit 81 is supplied with +2ΔI from the opposite end of the current mirror circuit 92B and with −2ΔI from the opposite end of the current mirror circuit 91B.

In the current integrating circuit 81, the switches are operated in a manner as shown in the timing chart of FIG. 17B. When the switch RST is turned off while the switch SAM is turned on, the current integrating circuit 81 starts the integrating operation thereof, which continues till the time the switch SAM is turned off. As is the case with the circuit shown in FIG. 13A, by carrying out the integration for a period of Δt, a voltage Vout is generated. In such case, when ΔI is 1 μA, the voltage of Vout=2 volt can be obtained by setting the capacitor C to 1 pF and Δt to 0.5 μs.

Even in this sensor signal read-out circuit 60A, although the current integrating circuit 81 has been shown and described as employed in the form of the full differential amplifier circuit, it may be of a circuit configuration operable to merely charge on the capacitor C as shown in FIG. 16.

As hereinabove described, even when the power supply circuit 80A in the sensor signal read-out circuit 60A is of the current mirror system, a change of the minute sensor current caused by external magnetic field can be extracted purely in the form of a differential current component.

Hereinafter, an embodiment of the magnetic array sensor circuit and the rotation detecting apparatus utilizing this magnetic array sensor circuit according to the present invention will be described with particular reference to the accompanying drawings.

Figure 18:
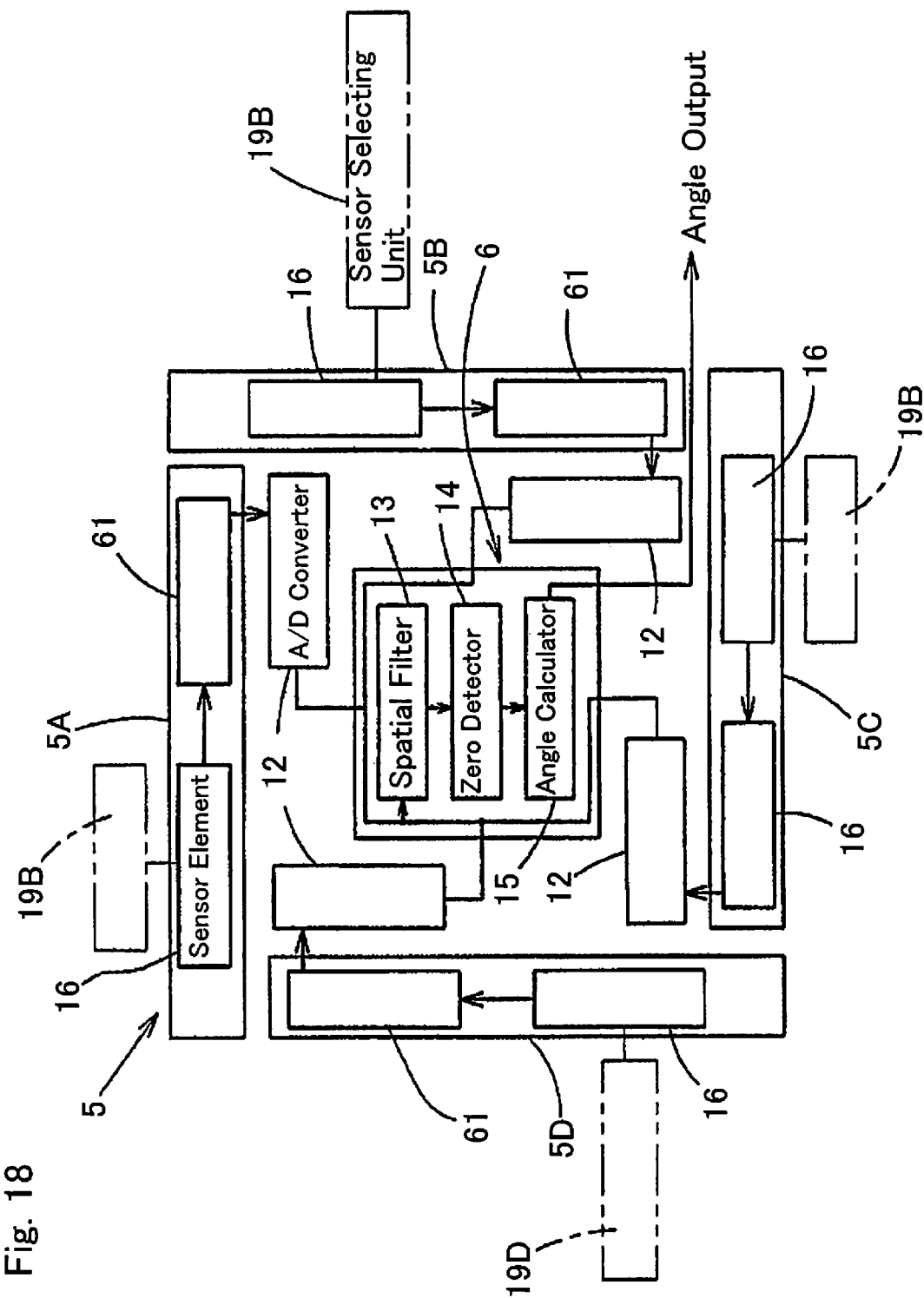
FIG. 18 is a circuit block diagram showing the circuit formed on the semiconductor chip used in the rotation detecting apparatus according to a third preferred embodiment of the present invention.

FIG. 18 is a circuit block diagram showing the circuit configuration of the semiconductor chip employed in the rotation detecting apparatus according to a third preferred embodiment of the present invention and particularly shows the circuit configuration of the semiconductor chip 9 applicable where an absolute output is obtained from the angle calculating unit 6. This third embodiment differs from the first embodiment shown in and described with particular reference to FIG. 3 in that in place of the amplifier 11 employed in the first embodiment, a magnetic array sensor circuit 61 is employed.

As shown therein, each sensor train 5A to 5D (FIG. 2) on each side of the square shape is comprised of the magnetic sensor elements $5_1$ to $5_n$ and the magnetic array sensor circuit 61 of the present invention having a read-out section. The magnetic sensor elements $5_1$ to $5_n$ are employed in the form of, for example, a magnetic transistor (MAGFET) and are of the same structure as that shown in and described with reference to FIG. 5. Also, the A/D converter 12 for digitalizing an analog signal outputted from the magnetic array sensor circuit 61 is disposed between each sensor train 5A to 5D and the angle calculating unit 6. The angle calculating unit 6 referred to above is of the same circuit configuration as that shown in and described in connection with the first embodiment and, accordingly, the details thereof are not reiterated for the sake of brevity.

Figure 19:
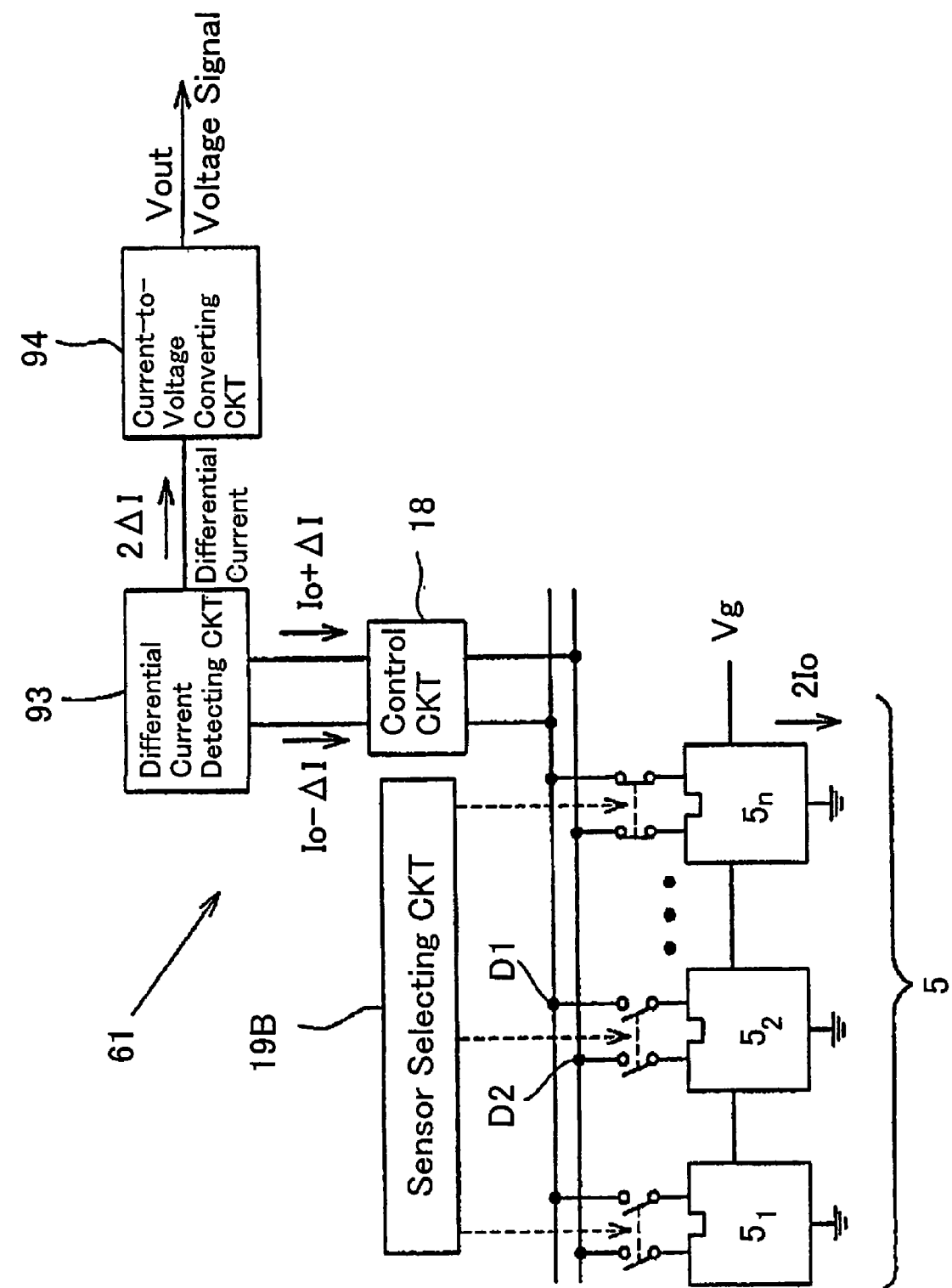
FIG. 19 is a block diagram showing one example of a magnetic array sensor circuit used in the rotation detecting apparatus shown in FIG. 18.

This magnetic array sensor circuit 61 is of a circuit configuration operable to process an output from the magnetic sensor array 5, in which the magnetic sensor elements $5_1$ to $5_n$ are arrayed as shown in FIG. 19 (the third embodiment), and includes, in addition to a differential current detecting circuit 93 and a current-to-voltage converting circuit 94, a control circuit 18, which operates the magnetic sensor elements $5_1$ to $5_n$ in a linear region operation, as a regulating circuit for reducing offset variation of an output of the arrayed magnetic sensor array 5. The magnetic sensor elements $5_1$ to $5_n$ are adapted to be selected by a sensor selecting unit 19B sequentially according to the order of arrangement into operation.

In FIG. 19, there is shown the case in which the currents Io−ΔI and Io+ΔI respectively flow through the two drain terminals D1 and D2.

The differential current detecting circuit 93 is a circuit operable to extract the difference 2ΔI between the two electric currents appearing at the magnetic sensor elements $5_1$ to $5_n$. The current-to-voltage converting circuit 94 is a circuit operable to convert the differential current, extracted by the differential current detecting circuit 93, into a voltage signal $V_{out}$ to thereby provide a sensor signal.

As described above, by the operation of the differential current detecting circuit 93 and the current-to-voltage converting circuit 94, the differential current can be extracted in the presence of the magnetic field applied to the magnetic sensor elements $5_1$ to $5_n$ and amplified to the voltage signal, whereby the sensor signal can be obtained in the form of a voltage signal.

Figure 20A:
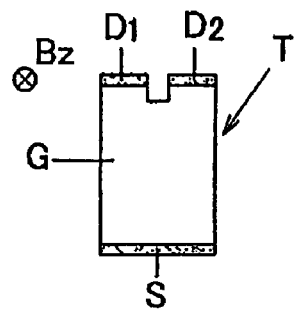
FIG. 20A is a plan view of a magnetic transistor.
Figure 20B:
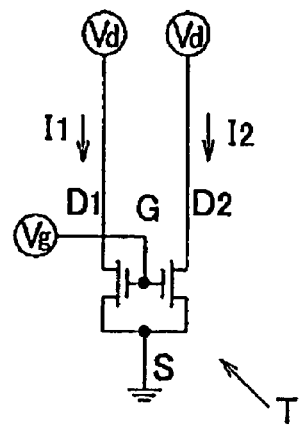
FIG. 20B is a circuit diagram showing an electric circuit of the magnetic transistor.

The magnetic transistor T forming each of the magnetic sensor elements is expressed by an equivalent circuit shown in FIG. 20B, and the difference between currents $I_1$ and $I_2$ flowing respectively to the two drain terminals D1 and D2 provides a magnetic field signal representative of the intensity of the magnetic field Bz. FIG. 20A is a plan view of the magnetic transistor T.

When the magnetic sensor elements $5_1$ to $5_n$ each in the form of the magnetic transistor T described above are arranged as illustrated in FIG. 19 to form the magnetic sensor array 5, the sensor outputs will vary with variation in characteristics of the individual elements, which in turn lead to offset variations.

Figure 21:
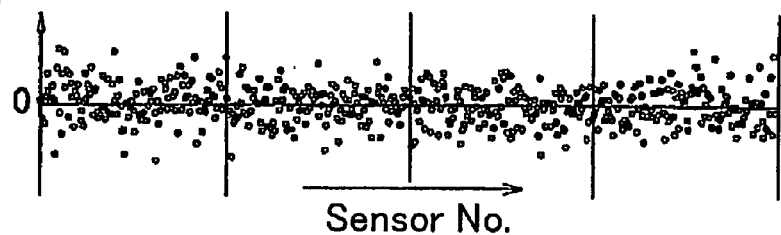
FIG. 21 is a graph showing offset outputs from the magnetic sensor elements used in the magnetic sensor array.

FIG. 21 illustrates an example of the sensor output signals (offset signals) of the magnetic sensor elements $5_1$ to $5_n$ in the magnetic sensor array 5 in the absence of the magnetic field. When the magnetic field Bz is applied to this magnetic sensor array 5, the output signal changes, but this output signal is superimposed with the offset signal and, accordingly, it will constitute an obstruction to measurement of the distribution of the magnetic field that is dealt with by the magnetic sensor array 5.

Figure 22:
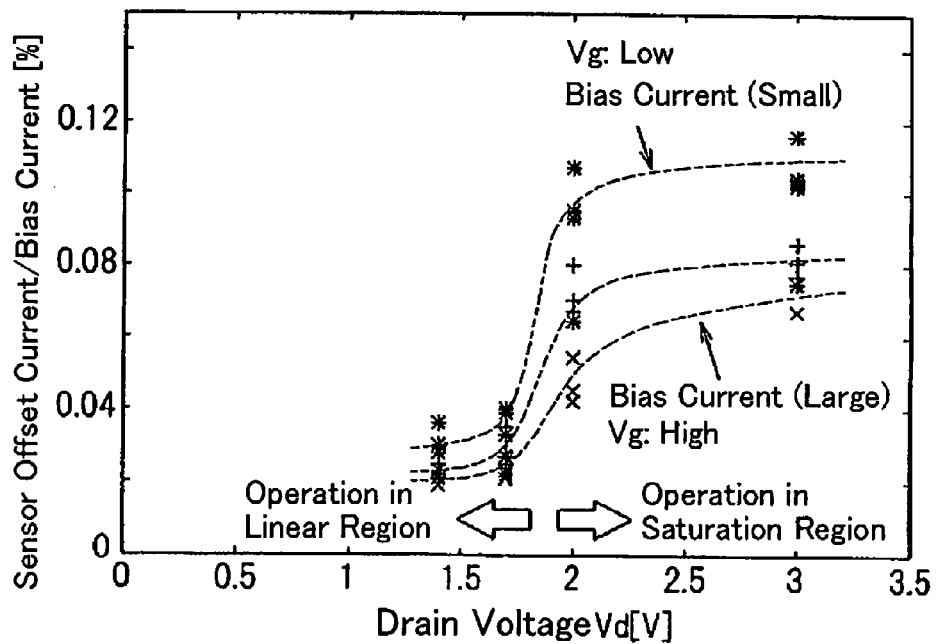
FIG. 22 is a graph showing the relation between a drain voltage and an offset variation in the magnetic transistor.

According to experiments, by measuring the output of the magnetic transistor is measured, it has been ascertained that depending on the operating condition of the transistor, the magnitude of an offset variation changes. More specifically, in the equivalent circuit diagram shown in FIG. 20B, under conditions where the voltage to be applied to the gate G of the transistor is fixed to Vg and the voltages at the drain terminals D1 and D2 are variable as represented by Vd, the relation between Vd and the offset variation represents such as shown in the chart of FIG. 22. In other words, by lowering the drain voltage Vd to shift the operating condition of the transistor from the operation in a saturation region to the operation in a linear region, the offset variation gradually decreases while the gate voltage Vg is fixed.

It may be convenient if by the utilization of this phenomenon, the offset variation is minimized and the sensor signal can be read out. However, in order to realize this condition, it is necessary to maintain the voltages Vd at the respective drain terminals D1 and D2 of the magnetic transistors T at the same potential without relying on the flowing current.

The control circuit 18 shown in FIG. 19 performs the function of maintaining the voltages Vd at the same potential and, thanks to this, this magnetic array sensor circuit 61 is so operable as to read out the sensor signal while the offset variation is suppressed.

Figure 23:
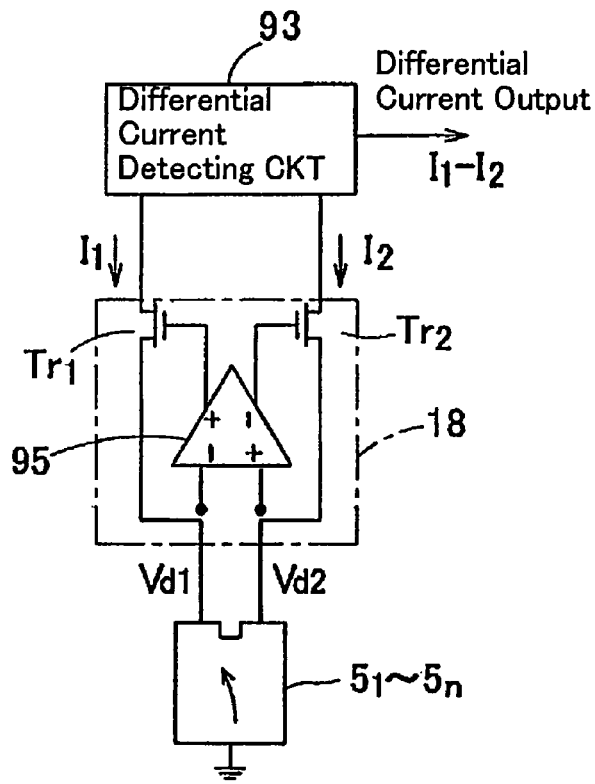
FIG. 23 is a circuit diagram showing one example of a control circuit used in the magnetic array sensor circuit.

FIG. 23 illustrates one example of the control circuit 18. This control circuit 18 is a circuit operable to detect terminal voltages at the two drain terminals D1 and D2 and maintain them at the same potential. More specifically, this control circuit 18 is configured as a feedback circuit including transistors Tr1 and Tr2 associated with the respective two drain terminals D1 and D2 (FIG. 20A) and a full differential amplifier circuit 95. In this control circuit 18, drain terminal voltages Vd1 and Vd2 are detected and those drain voltages are so controlled as to be at the same potential (Vd1=Vd2).

Figure 24:
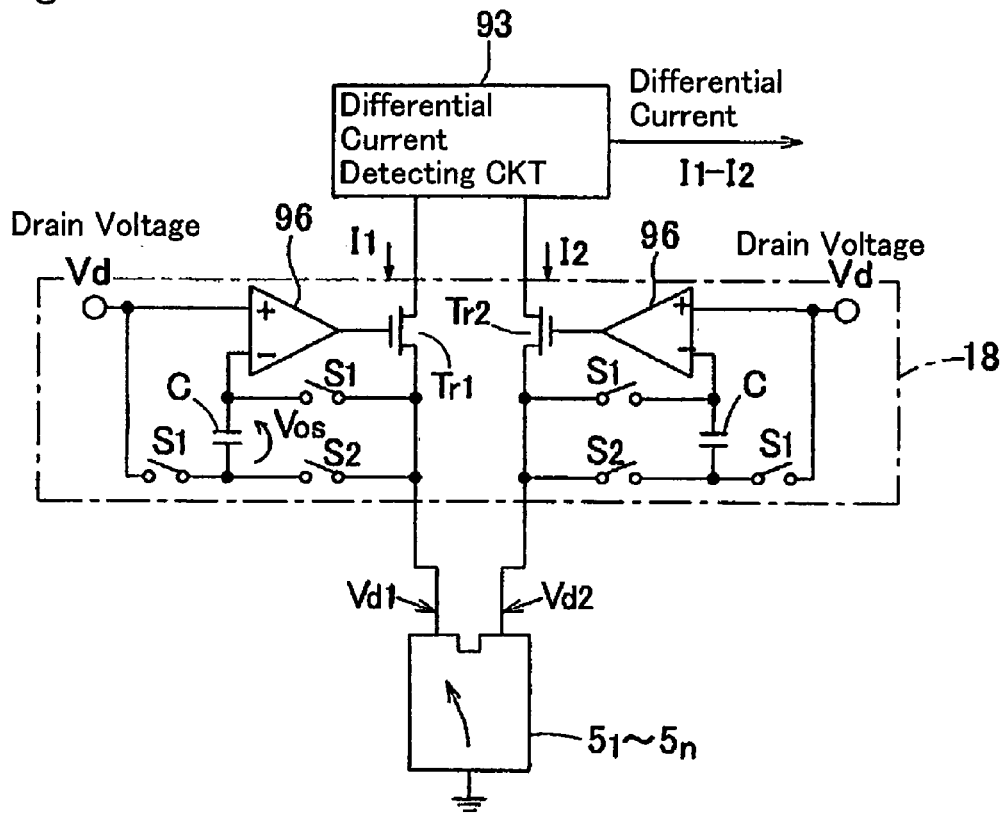
FIG. 24 is a circuit diagram showing another example of the control circuit used in the magnetic array sensor circuit.

FIG. 24 illustrates an example in which for the control circuit 18, single-ended amplifier circuits and capacitors are utilized. The control circuit 18 shown therein is in the form of a feedback circuit, each including transistors Tr1 and Tr2 associated with the respective two drain terminals D1 and D2 (FIG. 20A), single-ended amplifier circuit 96, capacitors C and two switches S1 and S2, and is so designed as to allow the capacitor to eliminate or compensate an offset of the amplifier circuit 96. Since this circuit is so structured, on each side of the two drain terminals D1 and D2, as to cancel the offset of the amplifier circuit 96 with the capacitor C, the drain terminal voltages Vd1 and Vd2 can be controlled to become equal to a reference voltage Vd with high precision.

The switches S1 and S2 employed in this control circuit 18 are operated in the following manner:
(1) The switch S1 is kept turned on until the sensor current stabilizes.
(2) Then, the difference Vos between the reference voltage Vd and the actual drain terminal voltages Vd1 or Vd2 is stored in the capacitor C.
(3) At this time, a voltage Vd+Vos is inputted to a feedback terminal (−terminal).
(4) Thereafter, the switch S1 is turned off.
(5) When the switch S2 is subsequently turned on, since the capacitor C storing Vos therein is connected with the feedback terminal (−terminal), the voltage at the drain terminal of the sensor becomes Vd and thereby the offset is cancelled.

In this way, the drain terminal voltages Vd1 and Vd2 can be controlled to become equal to the reference voltage Vd with high precision.

As hereinabove described, in the magnetic array sensor circuit 61 shown in FIG. 19, since the drain terminal voltages of the magnetic transistors T, which are the magnetic sensor elements $5_1$ to $5_n$ are controlled by the control circuit 18 so that the magnetic transistors T can be operated in the linear region, it is possible to reduce the offset variation of the plural magnetic sensor elements $5_1$ to $5_n$. For this reason, where the magnetic array sensor circuit 61 is applied in, for example, the rotation detecting apparatus, it is possible to increase the quality of the output signal from the magnetic sensor array 5 to thereby secure the precision of detection of the rotational angle.

Figure 25:
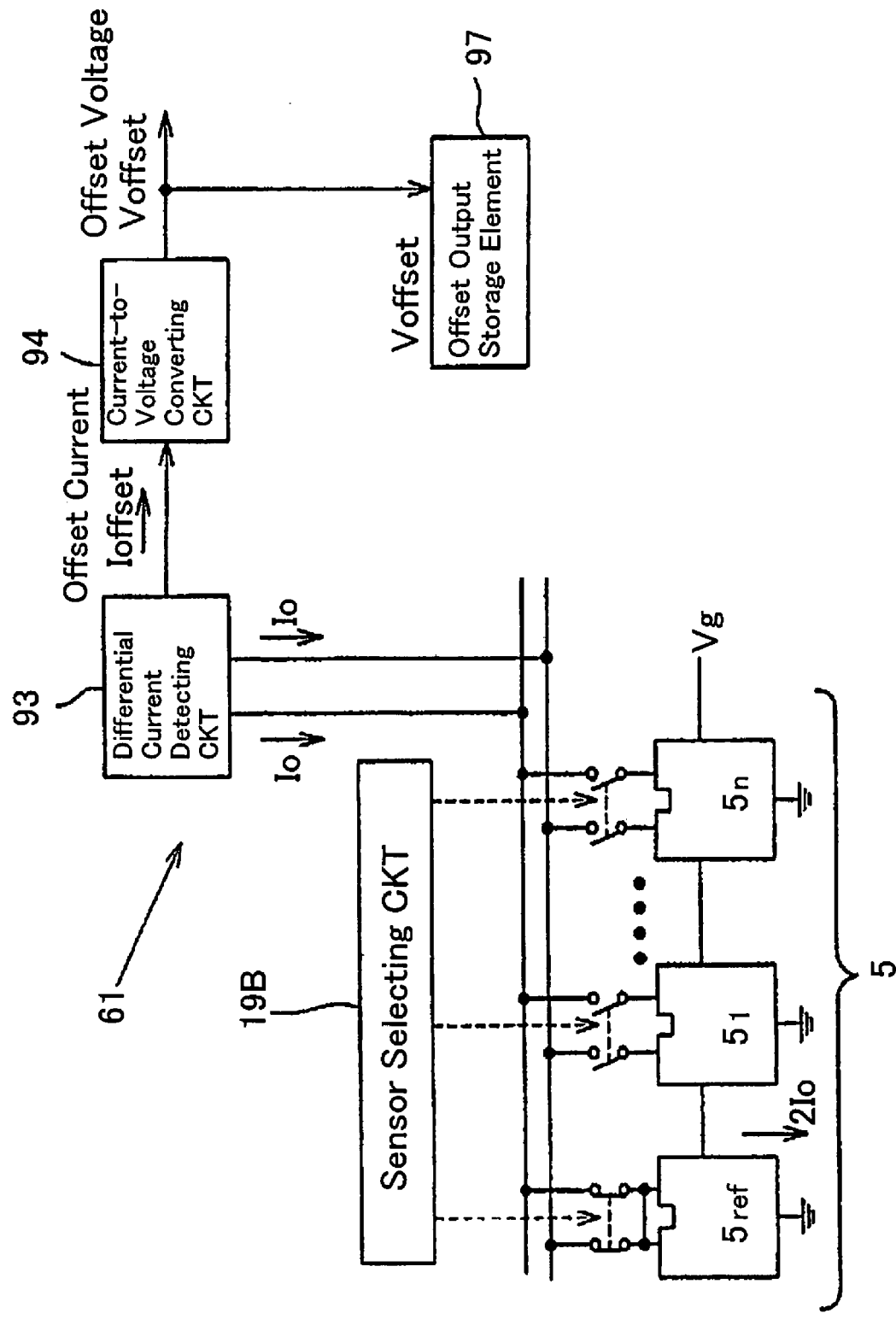
FIG. 25 is a circuit block diagram showing the manner in which reference sensor elements are selected in the magnetic array sensor circuit according to a fourth preferred embodiment of the present invention.
Figure 26:
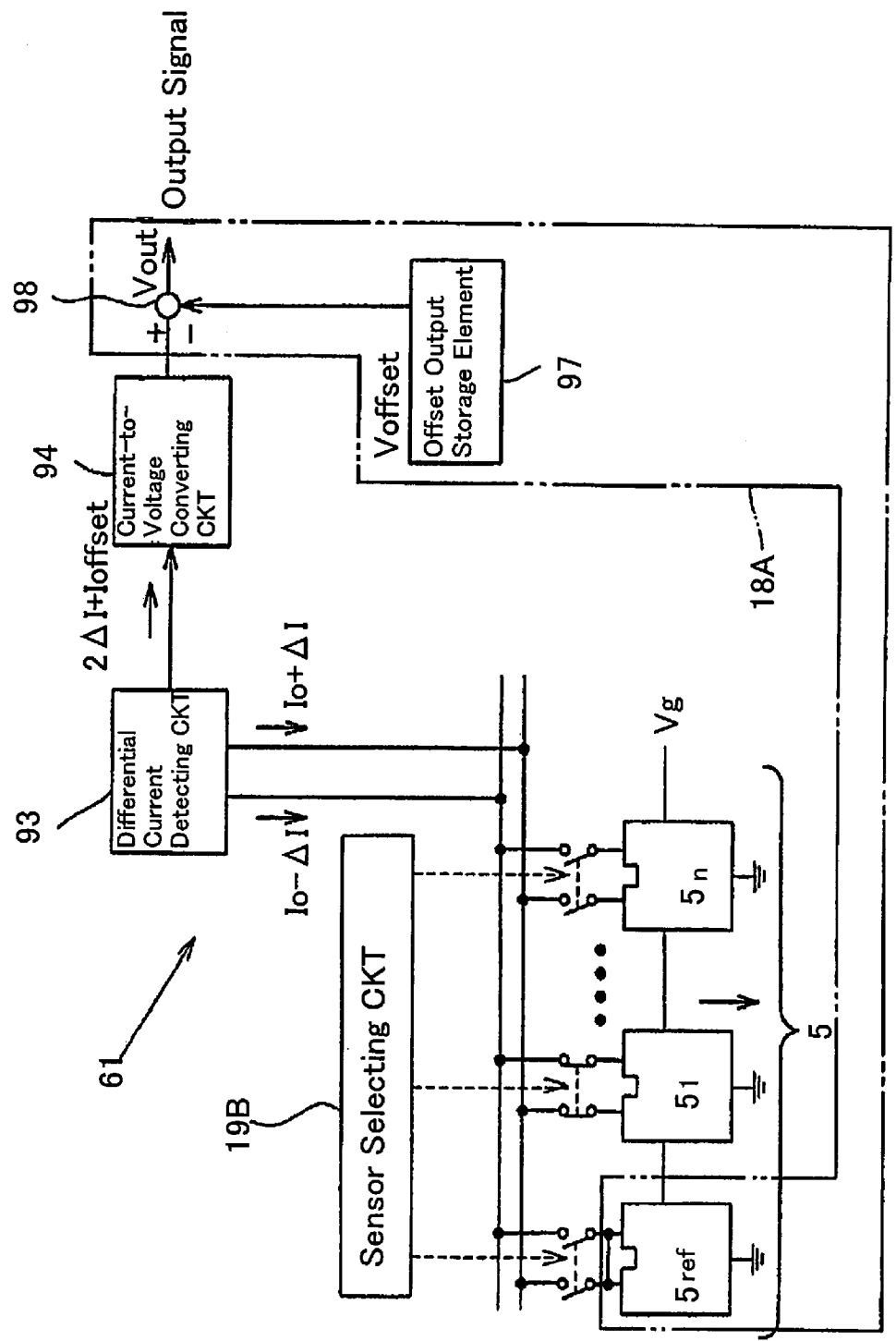
FIG. 26 is a circuit block diagram showing the manner in which the magnetic sensor elements are selected in the magnetic array sensor circuit according to the fourth embodiment of the present invention.

FIGS. 25 and 26 illustrate a fourth preferred embodiment of the present invention and are circuit block diagrams showing a condition of selection of the reference sensor element used in the magnetic array sensor circuit 61. The magnetic array sensor circuit 61 is similar to that employed in the practice of the third embodiment shown in FIG. 19, but differ therefrom in that in place of the use of the control circuit (regulating circuit) 18 for operating the magnetic sensor elements $5_1$ to $5_n$ in the linear region, the use is made of a regulating circuit 18A including the reference sensor element 5ref. FIG. 25 illustrates a condition in which the sensor selecting unit 19B selects the reference sensor element 5ref and FIG. 26 illustrates a condition in which the sensor selecting unit 19B selects one of the other magnetic sensor elements $5_1$ to $5_n$ (for example, the magnetic sensor element $5_1$ so far shown therein).

The regulating circuit 18A of the magnetic array sensor circuit 61 includes the reference sensor element 5ref short-circuited with the two output terminals (drain terminals) of the magnetic sensor element, an offset output storage element 97 for storing, as a reference offset value, a sensor signal read out by selecting the reference sensor element 5ref, and an analog subtraction circuit 98 (FIG. 26) for subtracting the stored reference offset value from outputs of the other magnetic sensor elements $5_1$ to $5_n$. The offset output storage element 97 may be an analog element such as a capacitor or may be an element capable of storing a digital value obtained by A/D converting an offset error. Also, in place of the analog subtraction circuit 98, a circuit for carrying out the subtraction using digital values may be employed.

In the meantime, in the standard magnetic array sensor circuit that is employed in the rotation detecting apparatus, since the magnetic sensor elements such as, for example, Hall elements or magnetic transistors forming the magnetic sensor array and the signal read-out circuit are formed in the silicon chip, the characteristic may change with change in environment such as, for example, temperature and/or warp. When the signal read out from the magnetic sensor array changes with this environmental change, the final result of detection of the rotational angle will be adversely affected.

The magnetic array sensor circuit 61 in this fourth embodiment is of a type provided with the reference sensor element 5ref, the offset output storage element 97 and the analog subtraction circuit 98 for the sake of protecting the rotation detecting apparatus from being easily affected by such environmental change as discussed above.

The reference sensor element 5ref is, as a part of the magnetic sensor array 5, arranged together with the magnetic sensor elements $5_1$ to $5_n$ and can be selected by the sensor selecting unit 19B for operation. Other structural features are substantially similar to that employed in the embodiment shown in and described with reference to FIG. 19.

In this magnetic array sensor circuit 61, the output signal is processed in the following manner:

(1) As shown in FIG. 25, when the sensor selecting unit 19B selects the reference sensor element 5ref and read out the sensor signal of the reference sensor element 5ref, since the reference sensor element 5ref has two output terminals short-circuited together and is therefore free from any offset, only the offset error generated inside the magnetic array sensor circuit 61 comprised of an amplifier circuit and others can be extracted and appears in an output. In other words, the error of the differential current detecting circuit 93 is outputted as Ioffset, the value of which is converted into a voltage by the current-to-voltage converting circuit 94, such voltage being then outputted as Voffset.

(2) This offset error (the offset voltage Voffset) is stored in the offset output storage element 97 and an offset error component is subtracted from the actual output signals of the magnetic sensor elements $5_1$ to $5_n$ by the analog subtraction circuit 98 as shown in FIG. 26. Specifically, the electric current of the magnetic sensor element $5_1$ then selected in FIG. 26 is held out of equilibrium by the magnetic field and becomes currents Io−ΔI and Io+ΔI, the difference of which is detected by the differential current detecting circuit 93. The differential current so detected is superimposed with an offset of the differential current detecting circuit 93 and 2ΔI+Ioffset is therefore outputted. When this is converted into a voltage by the current-to-voltage converting circuit 94, the offset error Voffset stored in the offset output storage element 97 is subtracted by the analog subtraction circuit 98 and, therefore, the offset component can be cancelled and only the signal component Vout of the outputs of the magnetic sensor elements can be extracted. In this way, the offset error in the magnetic array sensor circuit 61 can be cancelled.

In the operation described above, storage of the offset error is carried out at the initial stage of reading one line of the magnetic sensor array 5. In other words, arrangement may be made that storage of the offset value is carried out each time signals are read out from one line of the sensor array to thereby eliminate a drift of the circuit resulting from change in environment. In this way, it is possible to subtract, that is, cancel the offset error according to the condition of the circuits during each line read-out operation and the output signal stable enough to be not easily affected by the change in environment can be obtained. It is to be noted that the reference sensor element 5ref may be arranged at the front of one line of the magnetic sensor array 5 or at the end of one line of the magnetic sensor array 5.

As hereinabove described, in the magnetic array sensor circuit 61 according to each of the third and fourth embodiments, even though the circuit condition of the magnetic sensor elements $5_1$ to $5_n$, forming the magnetic sensor array 5, and the magnetic array sensor circuit 61 may change with change in temperature, the offset error of the circuit occurring that time is measured so that the actual sensor signal can be corrected. Accordingly, the output signal stable enough to be not easily affected by the influence brought about by the environment can be obtained.

Figure 27:
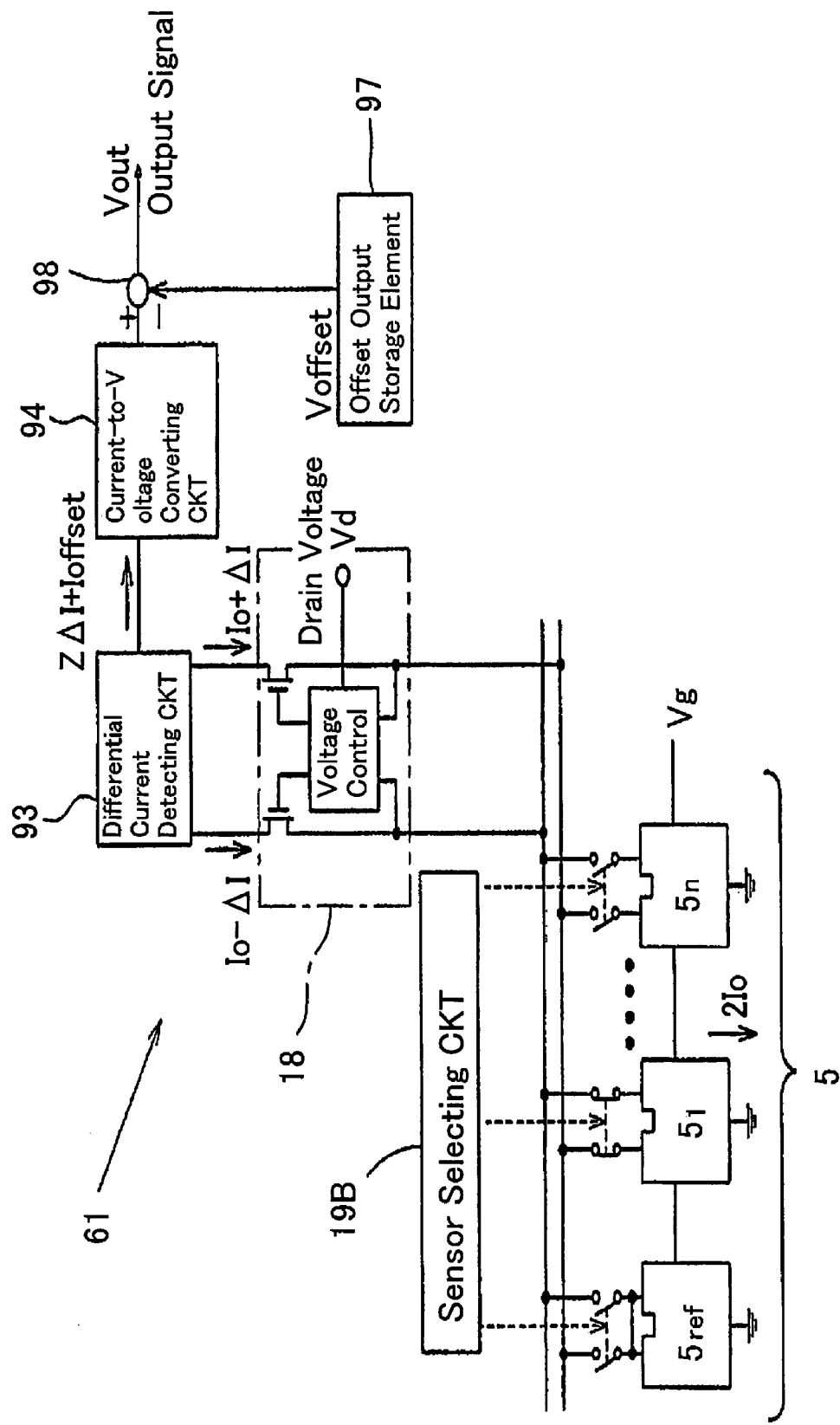
FIG. 27 is a circuit block diagram showing the magnetic array sensor circuit according to a fifth preferred embodiment of the present invention.

FIG. 27 illustrates a fifth preferred embodiment of the present invention. This fifth embodiment is substantially similar to the fourth embodiment shown in and described with reference to FIGS. 25 and 26, but differs therefrom in that in the magnetic array sensor circuit 61 employed in the fourth embodiment, the control circuit 18 of the type employed in the third embodiment shown in and described with reference to FIG. 19 is additionally employed.

In the case of this magnetic array sensor circuit 61, not only can the offset variation of the magnetic sensor elements 51 to 5n be reduced sufficiently because of the function of the control circuit 18, but the influence brought about by the change in environment and offset occurring in the magnetic array sensor circuit 61 can also be eliminated because of the functions of the reference sensor elements 5ref, the offset output storage element 97 and the analog subtraction circuit 98. Accordingly, by employing this magnetic array sensor circuit 61 is employed in, for example, the rotation detecting apparatus, not only can variation of the output signal from the magnetic sensor array 5 be suppressed to increase the precision of detection of the rotational angle, but reduction of the rotational angle detecting performance, which would otherwise result from the change in environment, can also be minimized.

The rotation detecting apparatus utilizing the magnetic array sensor circuit 61 according to any one of the third to fifth embodiments of the present invention is basically similar to the rotation detecting apparatus shown in and described in connection with any one of the first and second embodiments with reference to FIGS. 1 and 2 and, therefore, the details are not reiterated for the sake of brevity.

According to this rotation detecting apparatus 3, since the magnetic array sensor circuit 61 is employed, it is possible to reduce the offset variation of the magnetic sensor elements $5_1$ to $5_n$, by operating the magnetic sensor elements $5_1$ to $5_n$ forming the magnetic sensor array 5 in the linear region. It is also possible to remove the influence brought about by the environmental change and the offset occurring in the magnetic array sensor circuit. As a result, the angle detecting precision of the rotation detecting apparatus 3 increases and the resolution and precision as the rotary encoder increase.

Figure 28:
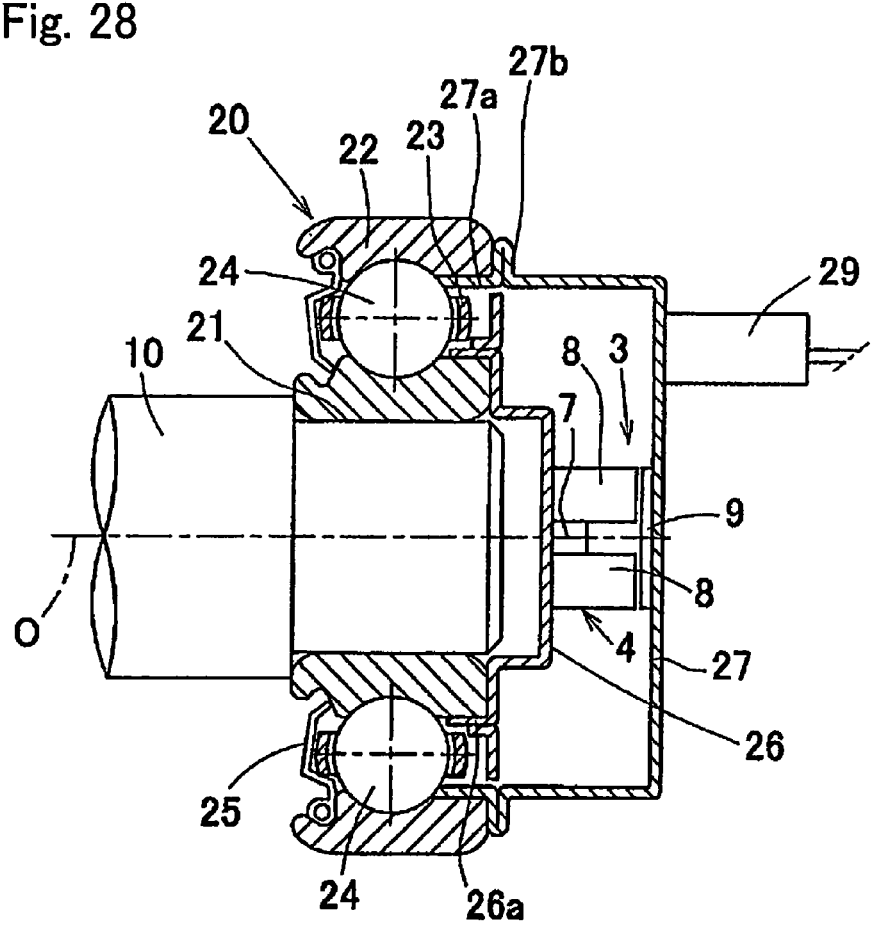
FIG. 28 is a sectional view showing one example of a rolling bearing assembly equipped with the rotation detecting apparatus of the present invention.
Figure 29:
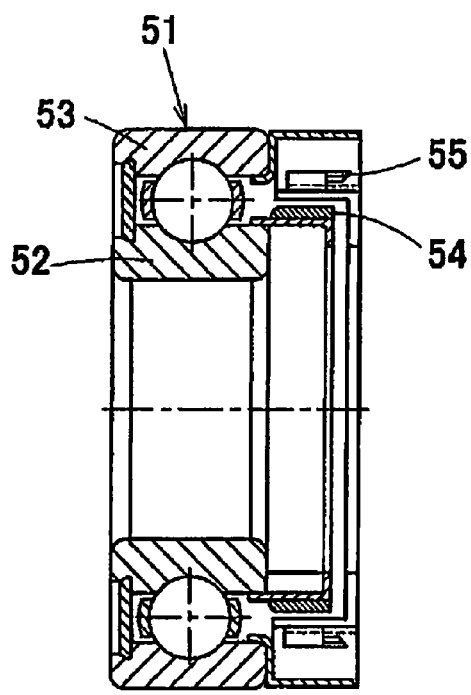
FIG. 29 is a longitudinal sectional view showing a conventional bearing assembly.
Figure 30:
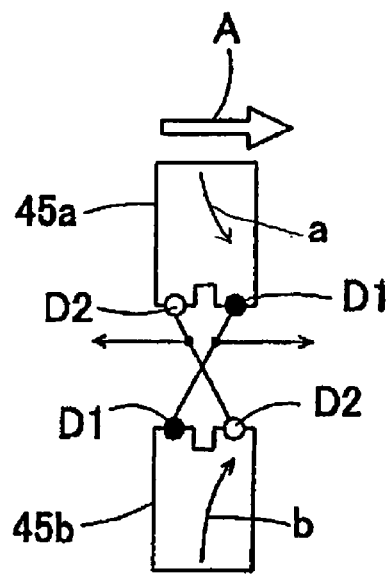
FIG. 30 is a circuit diagram showing a conventional parallel connected arrangement of the magnetic sensor elements.
Figure 31:
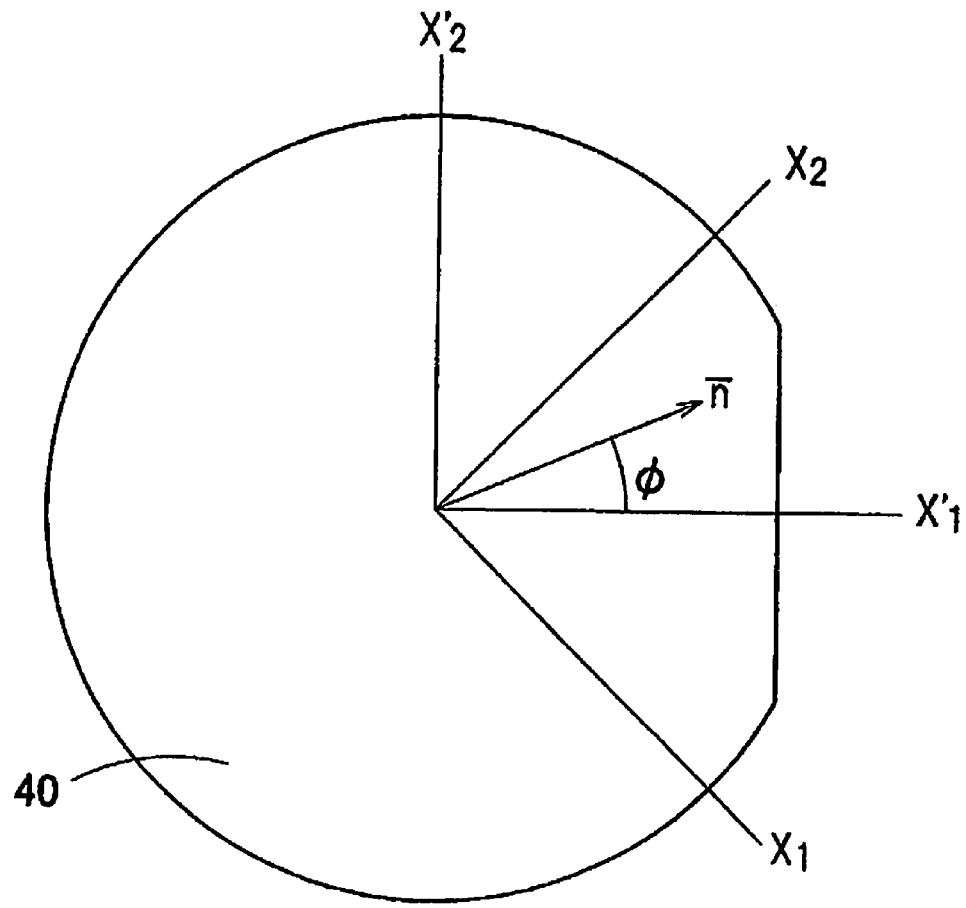
FIG. 31 is a schematic diagram showing the piezoresistive effect acting on a silicon wafer.
Figure 32A:
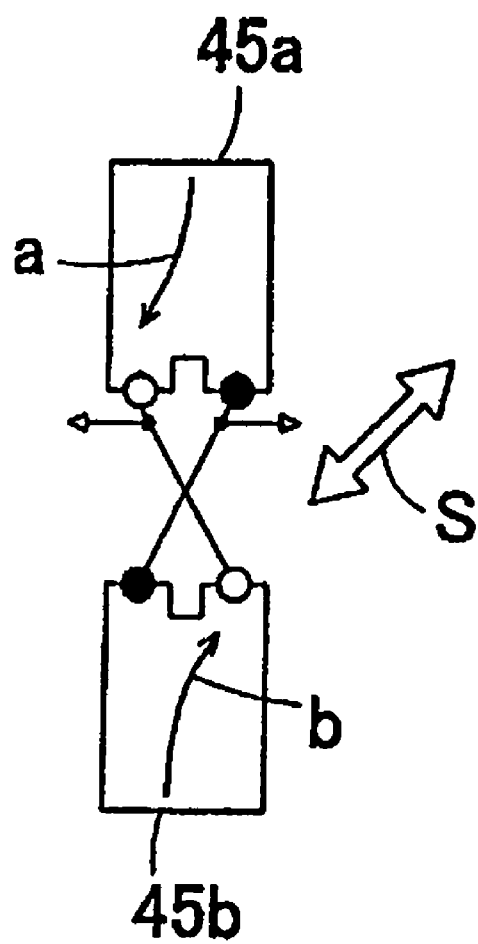
FIG. 32A is schematic diagram showing the piezoresistive effect occurring in the parallel connected arrangement of the sensor elements shown in FIG. 29.
Figure 32B:
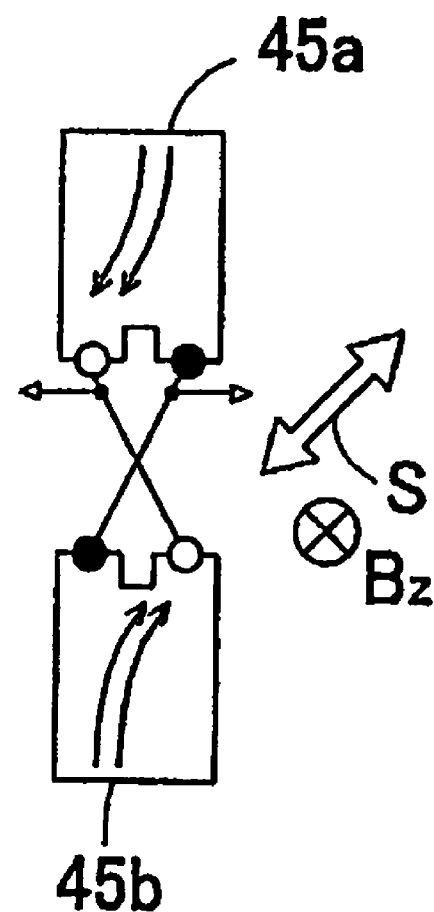
FIG. 32B is schematic diagram showing the piezoresistive effect occurring in the parallel connected arrangement of the sensor elements shown in FIG. 29.

FIG. 28 illustrates a rolling bearing assembly, in which the rotation detecting apparatus 3 constructed in accordance with any one of the foregoing embodiments is incorporated. It is to be noted that incorporation of the rotation detecting apparatus 3 in the rolling bearing assembly is equally applicable to any one of the first to fifth embodiment described hereinbefore.

The illustrated rolling bearing assembly 20 is of a type, in which a row of rolling elements 24, retained by a retainer 23, are interposed between respective raceways defined in inner and outer rings 21 and 22. The rolling elements 24 are in the form of a ball and this rolling bearing assembly 20 is so designed as to be a deep groove ball bearing. Also, a sealing member 25 covering one end of a bearing space is fitted to the outer ring 22. The inner ring 21 adapted to be mounted on a rotary shaft 10 is supported by the outer ring through the row of the rolling elements 24. The outer ring 22 is arranged in a housing of a machine or equipment that utilizes the bearing assembly.

The inner ring 21 has a magnet fitting member 26 fitted thereto, and the magnet 4 is secured to this magnet fitting member 26. The magnet fitting member 26 is so fitted to the inner ring 21 as to cover one end of a bore thereof. More specifically, the magnet fitting member 26 has a cylindrical portion 26a formed in an outer peripheral edge portion thereof, which is mounted on a shoulder outer peripheral surface of the inner ring 21, and a side plate portion in the vicinity of the cylindrical portion 26a for engagement with an end face of the inner ring 21 to allow it to be positioned relative to the axial direction.

The outer ring 22 is fitted with a sensor fitting member 27, to which the semiconductor chip 9, shown in FIG. 1, mounted with the magnetic sensor array 5 and the angle calculating unit 6, is fixed. Also, an output cable 29 for drawing the output externally from the angle calculating unit 6 is secured to this sensor fitting member 27. This sensor fitting member 27 is axially positioned, wherefor a free end cylindrical portion 27a in an outer peripheral portion thereof is mounted on an inner diametric surface of the outer ring 22 with a collar 27b formed in the vicinity of this free end cylindrical portion 27a being engaged with an end face of the outer ring 22.

As described above, when the rotation detecting apparatus 3 according to any one of the previously described embodiments is integrated with the rolling bearing assembly 20, not only can the number of component parts of the machine or equipment that utilizes the bearing assembly and the number of manufacturing steps be reduced, but also compactization can be achieved. In such case, since the rotation detecting apparatus 3 is compact in size and can provide the rotation angle output with high precision, a satisfactory rotation angle output can be obtained even in a small sized bearing assembly such as, for example, a small diameter bearing.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A rotation detecting apparatus comprising:
   a magnetic sensor array including a plurality of combined sensor element groups, each group including four sensor elements, the four sensor elements of each combined sensor element group being so arranged as to be oriented vertically and horizontally in four directions and connected parallel to each other; and
   a magnet rotatable in face-to-face relation with the magnetic sensor array, wherein the four sensor elements of each combined sensor element group are formed on one substrate.

2. The rotation detecting apparatus as claimed in claim 1, wherein the four sensor elements of each combined sensor element group are arranged in a cruciform pattern.

3. The rotation detecting apparatus as claimed in claim 1, wherein the four sensor elements of each combined sensor element group are arranged dispersed.

4. The rotation detecting apparatus as claimed in claim 1, wherein connection between the sensor element oriented vertically, and the sensor elements oriented horizontally, is provided in two modes.

5. The rotation detecting apparatus as claimed in claim 4, further comprising a connection mode selecting unit to select one of the two modes of connection.

6. The rotation detecting apparatus as claimed in claim 4, wherein the two modes of connection includes a first connection mode to detect a magnetic signal and a second connection mode to detect a stress signal.

7. The rotation detecting apparatus as claimed in claim 1, further comprising a read-out circuit to sequentially select and drive a plurality of the sensor elements forming the magnetic sensor array, extract a signal component from an electric current flowing through the sensor element, convert the signal component into a voltage and read the voltage.

8. The rotation detecting apparatus as claimed in claim 1, further comprising a magnetic array sensor circuit to process an output from the magnetic sensor array and including a regulating circuit to reduce an offset variation of an output of each of the magnetic sensor elements.

9. A bearing assembly equipped with the rotation detecting apparatus as defined in claim 1, wherein the magnetic sensor array is provided in a stationary raceway member and the magnet is provided in a rotating raceway member.

* * * * *